(12) United States Patent
Li et al.

(10) Patent No.: US 11,420,188 B2
(45) Date of Patent: Aug. 23, 2022

(54) SMART PAPER TRANSFORMER FOR ENHANCED CATALYTIC EFFICIENCY AND REUSABILITY OF NANOCATALYSTS

(71) Applicant: Board of Regents, The University of Texas System, Austin, TX (US)

(72) Inventors: XiuJun Li, El Paso, TX (US); Qijie Jin, El Paso, TX (US)

(73) Assignee: Board of Regents, The University of Texas System, Austin, TX (US)

(*) Notice: Subject to any disclaimer, the term of this patent is extended or adjusted under 35 U.S.C. 154(b) by 169 days.

(21) Appl. No.: 16/687,039

(22) Filed: Nov. 18, 2019

(65) Prior Publication Data
US 2020/0156048 A1 May 21, 2020

Related U.S. Application Data

(60) Provisional application No. 62/768,586, filed on Nov. 16, 2018.

(51) Int. Cl.
| | |
|---|---|
| *B01J 23/52* | (2006.01) |
| *B01J 37/06* | (2006.01) |
| *B01J 37/04* | (2006.01) |
| *B01J 37/16* | (2006.01) |
| *B82Y 40/00* | (2011.01) |
| *B82Y 30/00* | (2011.01) |

(52) U.S. Cl.
CPC .............. *B01J 23/52* (2013.01); *B01J 37/04* (2013.01); *B01J 37/06* (2013.01); *B01J 37/16* (2013.01); *B82Y 30/00* (2013.01); *B82Y 40/00* (2013.01)

(58) Field of Classification Search
None
See application file for complete search history.

(56) References Cited

PUBLICATIONS

Miura et al., In situ synthesis of gold nanoparticles on zinc oxides preloaded into a cellulose paper matrix for catalytic applications, BioResources, 2011, 4990-5000 (Year: 2011).*

* cited by examiner

*Primary Examiner* — Coris Fung
*Assistant Examiner* — Keling Zhang
(74) *Attorney, Agent, or Firm* — Yee & Associates, P.C.

(57) ABSTRACT

A method of synthesizing a smart paper transformer is provided. The method comprises combining paper with $HAuCl_4$ and stirring together in an aqueous solution to form a pulp. The pulp is treated with $NaBH_4$ aqueous solution. The treated pulp is then washed and centrifuged with water a number of times to form a gold nanosponge (AuNS) catalyst pulp.

14 Claims, 38 Drawing Sheets

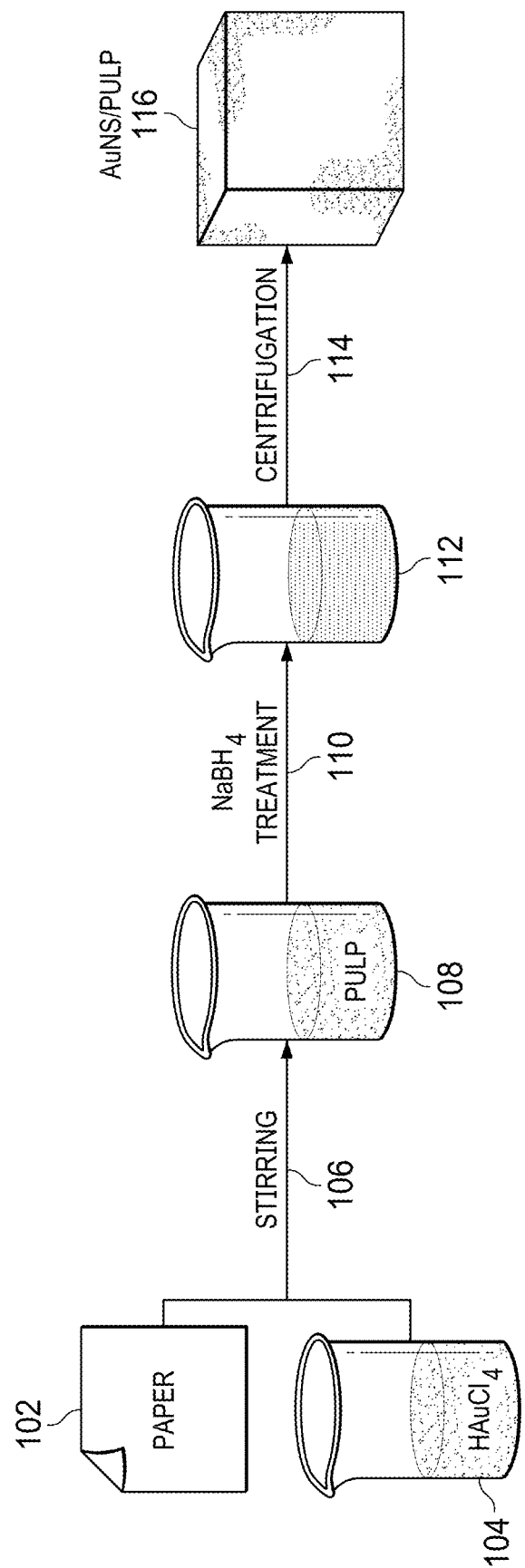

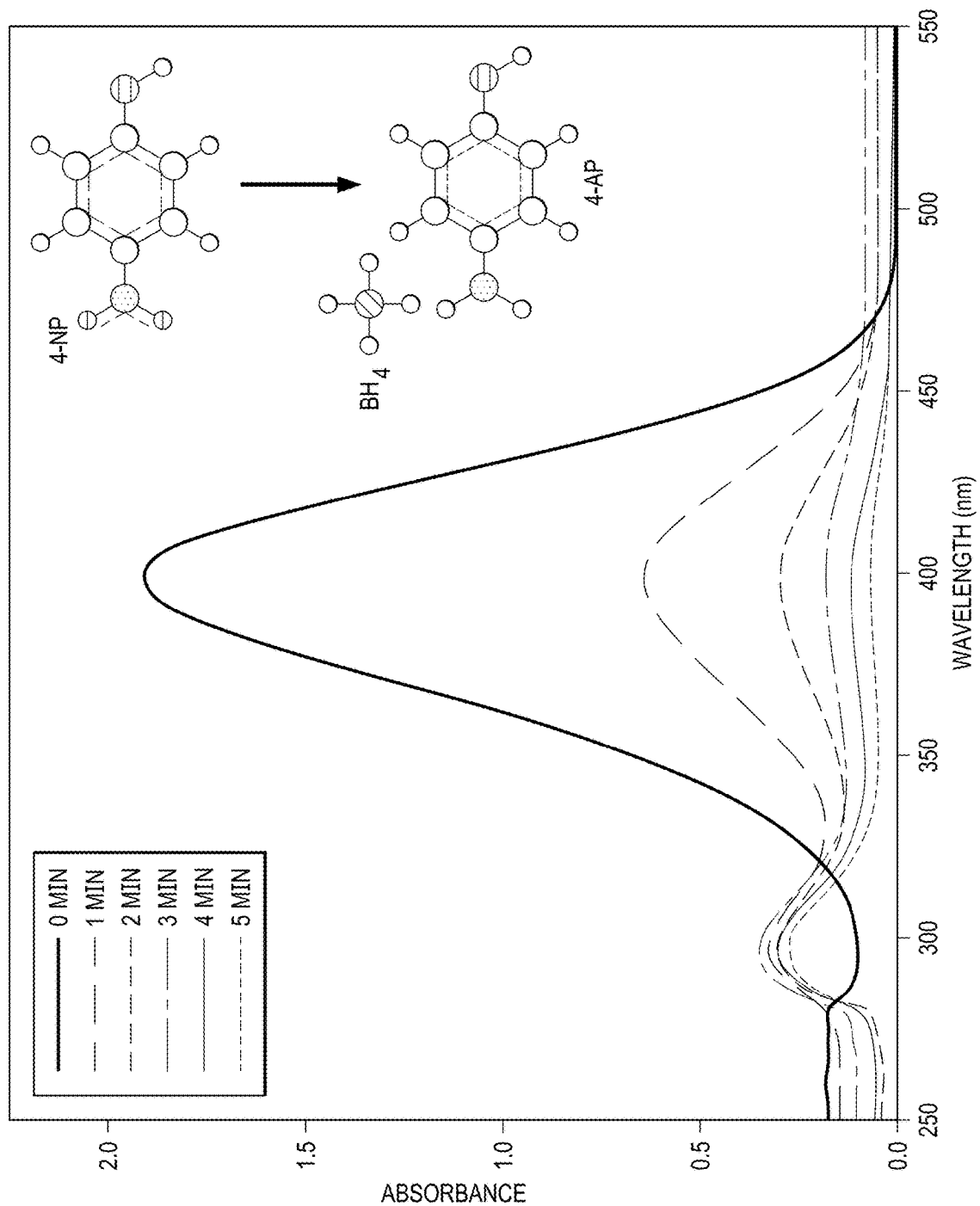

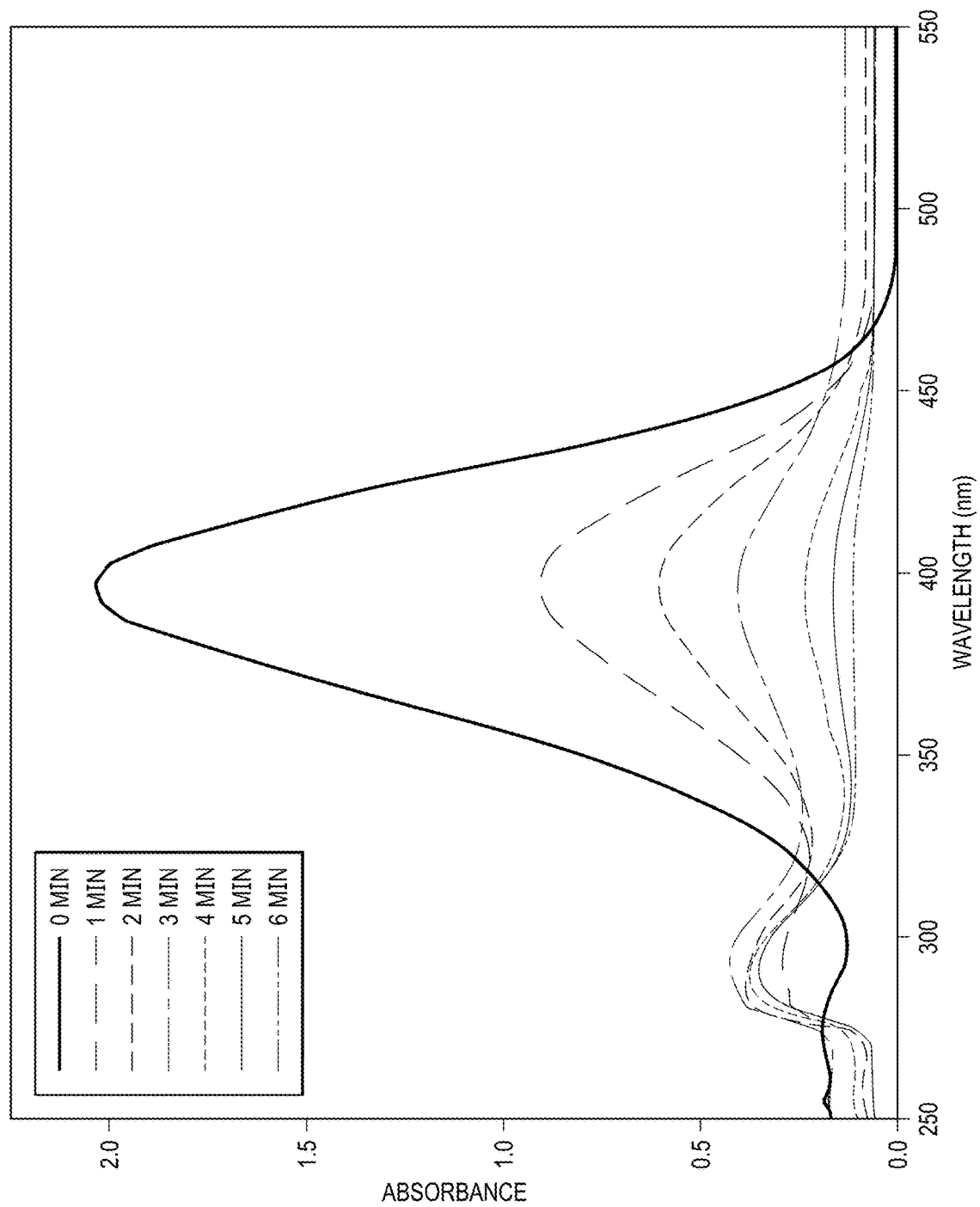

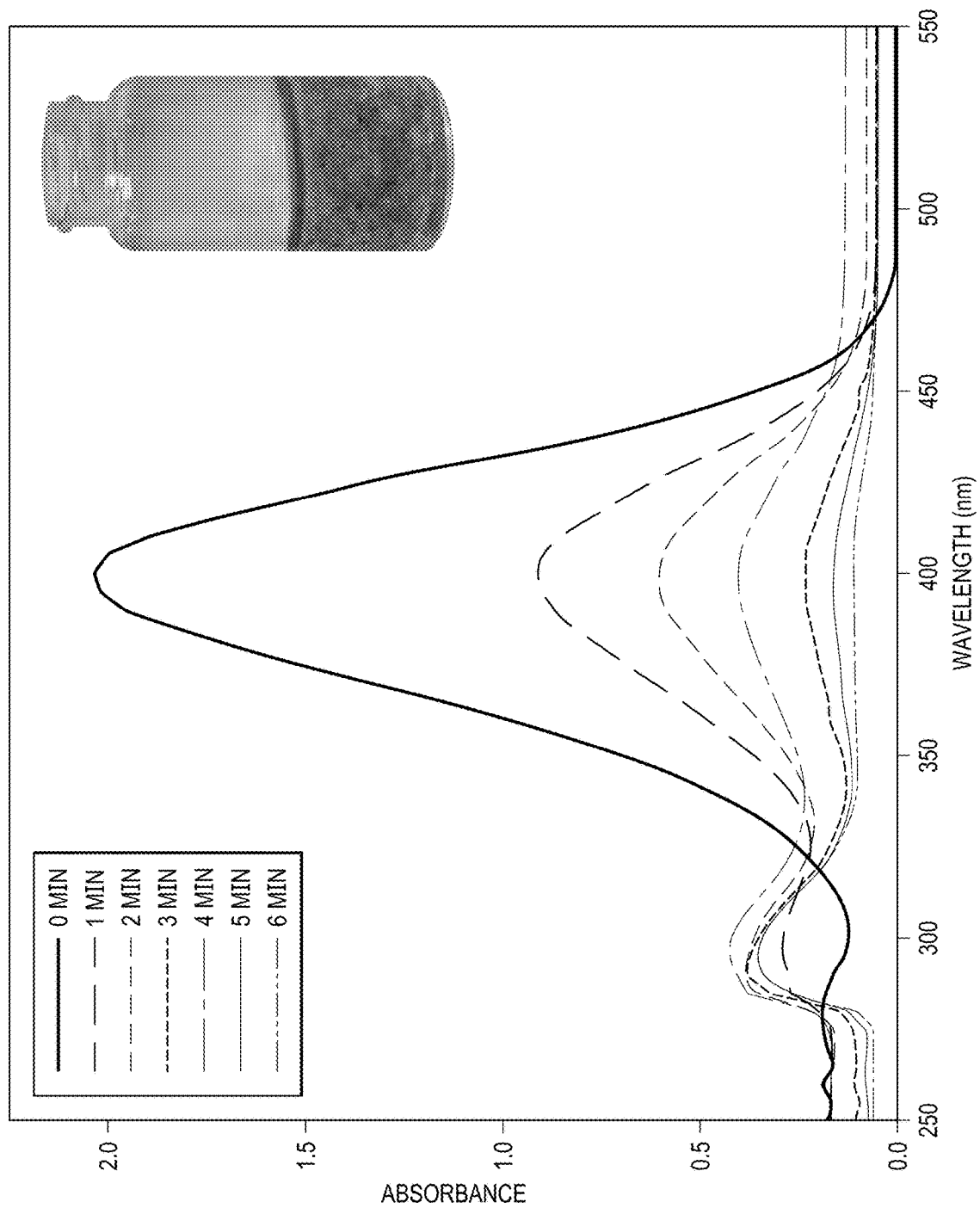

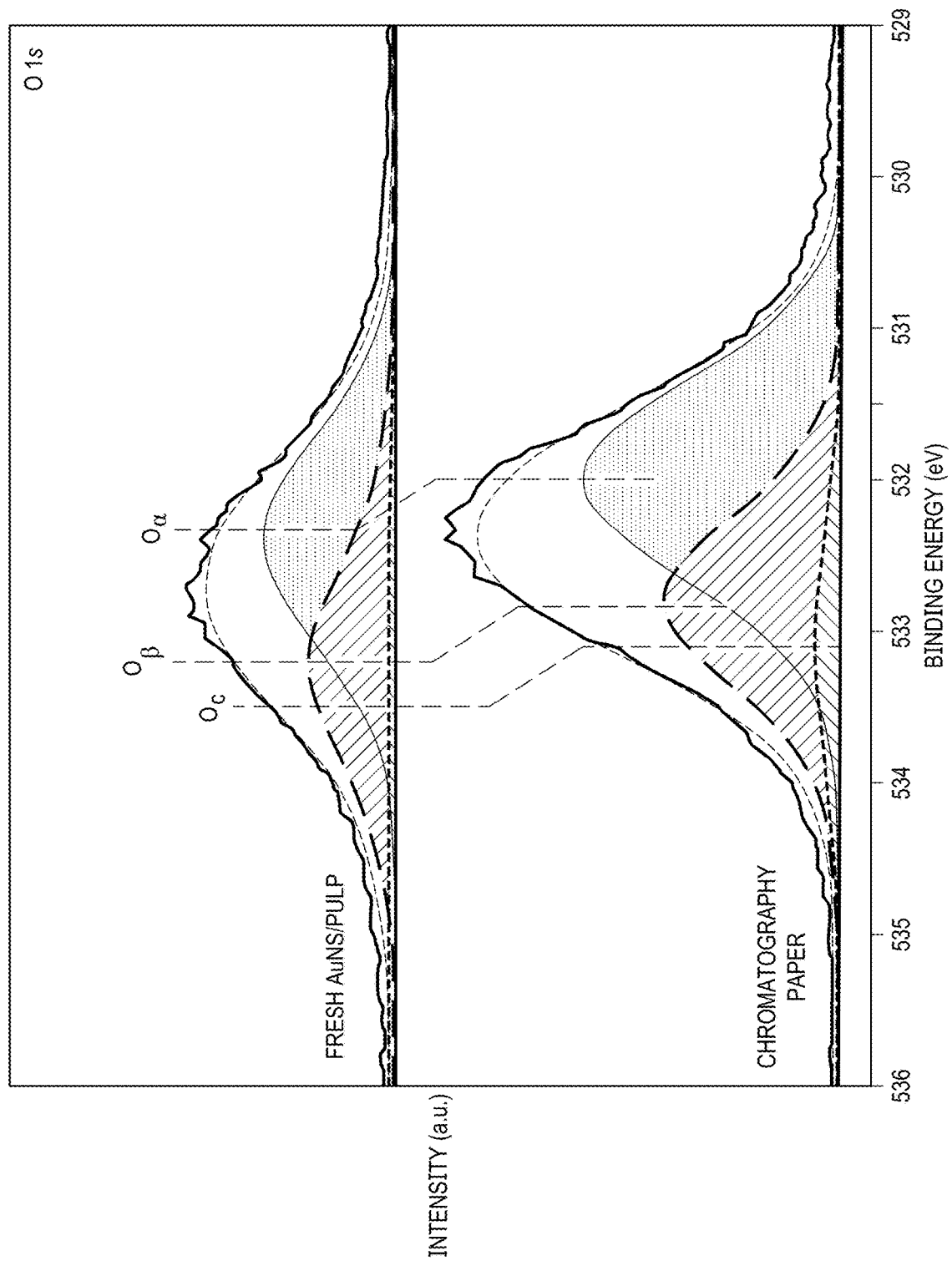

SMART PAPER TRANSFORMER FOR ENHANCED CATALYTIC EFFICIENCY AND REUSABILITY OF NANOCATALYSTS

RELATED PROVISIONAL APPLICATION

This application claims the benefit of U.S. Provisional Patent Application Ser. No. 62/768,589, filed Nov. 16, 2018, and entitled "Smart Paper Transformer."

BACKGROUND

The disclosure relates generally to paper manufacturing.

Nanomaterials have been attracting increasing attention in multiple disciplines due to their unique size and shape effects. As an important member of nanomaterials, noble metal nanocatalysts (Au nanoclusters, Pd nanoparticles, Pt nanoparticles, etc.) have wide applications in many fields, such as environmental catalysis, photothermal therapy, carbon-carbon coupling reactions, etc. Among these applications, environmental catalysis, especially the water treatment, attracts more attention because of its ecological value and importance. So far, $Au/TiO_2$, AgNPs/SiNSs, $Pd/C_3N_4$ and many other noble metal nanocatalysts have been used for the water treatment. However, the noble metal catalysts often fall into a dilemma: it is difficult to maintain both high catalytic efficiency and high reusability at the same time. Catalysts for water treatment can be divided into two categories: liquid phase catalysts and solid phase catalysts. Liquid phase catalysts exhibit high catalytic efficiency, but it is challenging to separate them from waste water after use. For instance, $Au/TiO_2$ and Au colloidal solutions exhibited excellent catalytic performance for p-nitrophenol (4-NP) reduction, but they were hard to recover, resulting in low reusability. On the other hand, solid phase catalysts have high reusability, but the catalytic efficiency is not as high as liquid phase catalysts. Although $Pd/MoS_2$ can be easily reused five times, it needs 10 min. to finish the 4-NP reaction (k value=0.386 min−1, lower than that of many liquid phase catalysts). Additionally, noble metal nanomaterials are easy to aggregate, which further causes a decrease of the catalytic efficiency. Therefore, the synchronous increase in catalytic efficiency and reusability is significant yet challenging for noble metal nanocatalysts. Some literature has reported the $Fe_3O_4$ supported noble metal nanocatalysts (Au—$Fe_3O_4$@MOF, Pt—$Fe_3O_4$@graphene), which control the recycling process by the magnetic properties. They exhibit both high catalytic efficiency and high reusability, but the complex preparation process limits their application.

SUMMARY

An illustrative embodiment provides a method of synthesizing a smart paper transformer. The method comprises combining paper with $HAuCl_4$ and stirring together in an aqueous solution to form a pulp. The pulp is treated with $NaBH_4$ aqueous solution. The treated pulp is then washed and centrifuged with water a number of times to form a gold nanosponge (AuNS) catalyst pulp.

Another illustrative embodiment provides a method of catalytic reduction. The method comprises stirring a gold nanosponge (AuNS) catalyst in a solid paper phase into water to form an AuNS catalyst pulp and adding an aqueous solution of a nitroaromatic compound and $NaBH_4$ to the AuNS catalyst pulp and stirring, thereby reducing the nitroaromatic compound.

BRIEF DESCRIPTION OF THE DRAWINGS

FIG. 2 depicts actual preparation illustration of the s-PAT supported AuNS/pulp catalyst;

FIG. 3(a) depicts UV-vis absorption spectra of the 4-NP reduction in the presence of (a) 54 mg AuNS/pulp catalyst;

FIG. 5(b) depicts UV-vis absorption spectra of the 4-NP reduction (1 mM) in the presence of 0.10 M $NaBH_4$;

FIG. 8(a) depicts UV-vis absorption spectra of the 4-NP reduction by AuNS/pulp catalyst;

FIG. 17(b) depicts O 1s XPS high-resolution scan spectra of the chromatography paper and the AuNS/pulp catalysts;

DETAILED DESCRIPTION

Figure 1:
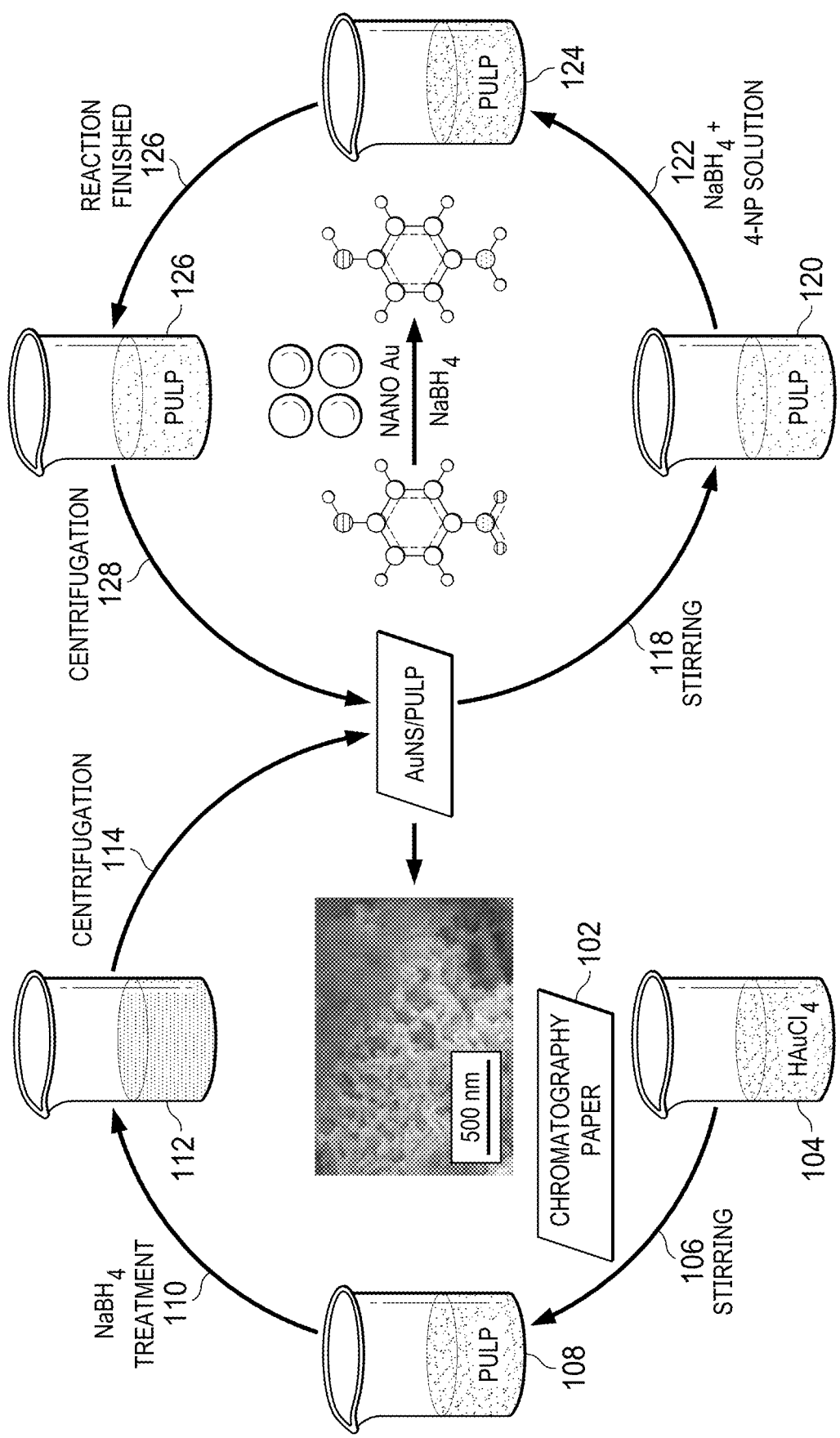
FIG. 1 depicts a schematic of the preparation (left) and application (right) processes of the s-PAT supported AuNS/pulp catalyst in accordance with illustrative embodiments.

Aspects of the present invention are described herein with reference to diagrams of methods and apparatuses according to embodiments of the invention. The diagrams in the Figures illustrate the architecture and operation of possible implementation methods according to various embodiments of the present invention.

Although noble metal nanocatalysts show superior performance to conventional catalysts for paper production, it is difficult to take into account both catalytic efficiency and reusability. Taking advantage of the easy phase conversion between paper and pulp, the illustrative embodiments provide a smart paper transformer (s-PAT) to support catalysts to address this dilemma, in which the phase of pulp is used to keep high catalytic efficiency of nanocatalysts while the transformation to paper enables their high reusability.

As an active ingredient, Au nanomaterial is an excellent electron-donor or acceptor, so it has the capacity to promote the catalytic reaction by the redox cycle process significantly. It also exhibits excellent chemical inertness and can keep stable under various reaction conditions. Therefore, Au nanomaterials are excellent catalysts in catalytic reactions. Among different Au nanostructures, Au nanosponge (AuNS) has three-dimensional open architectures so that it can expose large amounts of catalytically active sites. The large surface-to-volume ratio and the presence of more hotpots are also beneficial for its superior catalytic activity. In addition, there is no need to add an additional protective capping agent for AuNS, while AuNPs need it to avoid aggregation. In other words, AuNS is a robust and high-efficiency catalyst.

Along with catalysts, catalyst carriers also play a vital role for efficient catalytic reactions, such as graphene oxide, TiO2, polymer, and cellulose. Chromatography paper, which consists of cellulose microstructures (micro-sized diameter), can be used as a 3D carrier with high effective areas. In addition, paper has a unique property such that its liquid (i.e. pulp) and solid phases can be easily and reversibly switched. When paper is transformed into pulp, pulp can be uniformly suspended in water, which increases the contact area between catalysts and reactants, hence improving the catalytic efficiency. On the other hand, when pulp is dried, it will become the solid phase (i.e. the so-called paper), and the catalyst on the solid paper thus can be easily recovered together with paper. The paper-supported catalysts can be also used many times by repeating this process, allowing for good reusability.

Specifically, as an example of the paper transformer, a novel and easily recoverable chromatography paper-supported Au nanosponge (AuNS/pulp) catalyst is obtained by a water-based in-situ preparation process. The illustrative embodiments provide a high catalytic efficient and reusable paper transformer-supported nanocatalyst for reduction of p-nitrophenol. The composition, structure, and morphology of the AuNS/pulp catalyst have been characterized by XRD, TGA, SEM, FT-IR, and XPS.

The AuNS/pulp catalyst is transformed into a pulp phase during the catalytic reaction and into the paper phase to recover catalysts after use. Owing to this smart switch of physical morphology, the AuNS/pulp catalyst is dispersed more evenly in the solution. Therefore, it exhibits excellent catalytic performance for the p-nitrophenol reduction. Under optimal conditions, the conversion rate of p-nitrophenol reaches nearly 100% within 6 min., and the k value of AuNS/pulp ($0.0106$ $s^{-1}$) is more than twice that of a traditional chromatography paper-based catalyst ($0.0048$ $s^{-1}$). Additionally, the AuNS/pulp catalyst exhibits outstanding reusability and can maintain its high catalytic efficiency even after fifteen recycling times.

Accordingly, the unique phase switch from this smart paper transformer enables the Au nanosponge to transform into a highly efficient, recoverable, and cost-effective multifunctional catalyst. The paper transformer can support various nanocatalysts for a wide range of applications, thus providing a new sight to maintain both high catalytic efficiency and reusability of nanocatalyst in the fields of environmental catalysis and nanomaterials.

The present disclosure provides several advantages, including:
1. A facile, one-step approach to synthesize the smart paper transformer (s-PAT) supported AuNS/pulp.
2. The first time developing and applying the phase transformation of the s-PAT to nanocatalysis.
3. The smart transformation between the liquid phase of pulp and the solid phase paper from the s-PAT supported noble metal nanocatalysts ensures not only high catalytic efficiency, but also excellent reusability. The Au/pulp catalyst still exhibits the high catalytic efficiency of 91.6% within 7 min. in the fifteenth cycle of reuse for the 4-NP reduction.
4. Liquid phase catalysts often exhibit high catalytic efficiency but not good reusability, whereas solid phase catalysts can easily achieve high reusability but not high catalytic efficiency. Therefore, phase transformation of the illustrative embodiments solves a vital problem in the current field of catalysis by fusing both high efficiency and outstanding reusability onto same noble metal nanocatalysts.

The s-PAT of the present disclosure provides a solution to address a vital problem of current noble metal catalysts by unifying both high efficiency and high reusability. That is to say, the chromatography paper or filter paper is an excellent catalytic carrier for noble metal nanocatalysts. Although the chromatography paper has used as catalyst carriers, none of them utilized the unique phase-transforming property of paper (switching easily between paper and pulp). Furthermore, paper has abundant hydroxyl (—OH) functional groups on the cellulose surface, ensuring strong binding strength between paper and Au nanomaterials and that the nanocatalyst cannot be washed away.

Given the aforementioned features of s-PAT, the smart paper transformer can make the chromatography paper-supported noble metal nanocatalysts such as AuNS (AuNS/pulp) possess high catalytic efficiency and high reusability. To verify the hypothesis, the catalytic reduction of nitroaromatic compounds such as p-nitrophenol (4-NP) and o-nitroaniline (2-NA), pollutants, is chosen as a model for the application of AuNS/pulp catalyst for water treatment. It is well known that 4-NP and 2-NA are important contributors to worsening environment problems such as water contamination, which causes mutagens, teratogens, carcinogens, etc.

Sodium borohydride (NaBH4, 98%) was purchased from Alfa Aesar (Tewksbury, Mass.). P-nitrophenol (4-NP) was purchased from EMD Millipore Corporation (Billerica, Mass.). Gold (III) chloride trihydrate (HAuCl4.3H2O) was acquired from Sigma (St. Louis, Mo.). Chromatography paper (Whatman #1) with 240 mm in diameter and 180 μm in thickness was purchased from Whatman (Maidstone, England). Water with resistivity of 18.2 MΩ·cm@25° C. from a Millipore Milli-Q system (Bedford, Mass.) was used to prepare solutions. All chemicals were of analytical grade and used without further processing.

A simple water-based in-situ preparation process was used to prepare the AuNS/pulp catalysts. FIGS. 1 and 2 present the preparation process and application of the AuNS/pulp nanocatalyst. Firstly, the chromatography paper 102 was cut into square with dimensions of 1×1 cm² by using a Laser cutter (Zing 16-30w, Epilog, America). Then 160 mg HAuCl4.3H2O is added into 4 mL ultrapure water to obtain the HAuCl4 yellow clarified solution 104. Secondly, 16 pieces of chromatography paper (138 mg) and the HAuCl4 solution were mixed together in a 20 mL vial and kept vigorous stirring (step 106) for 4 h in dark. The pulp 108 is formed after stirring. Thirdly, 90 mg of NaBH4 is dissolved into 3 mL ultrapure water. Then the NaBH4 solution is added into the pulp rapidly and kept vigorous stirring for 1 h to completely reduce $Au^{3+}$ to $Au^0$ according to Equation (1) (step 110).

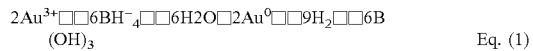

$$2Au^{3+} + 6BH^-_4 + 6H_2O \rightarrow 2Au^0 + 9H_2 + 6B(OH)_3 \qquad \text{Eq. (1)}$$

The resulting black pulp suspension 112 is washed and centrifuged three times with water (step 114) to obtain the purple pulp 116 with AuNS on it. The pulp is then dried at 60° C. for 6 hours, and the s-PAT-supported Au catalyst is obtained and stored at room temperature before use.

The catalytic efficiency of the s-PAT-supported AuNS/pulp catalyst was investigated by its application in the 4-NP conversion to p-aminophenol (4-AP). Firstly, the appropriate AuNS/pulp catalyst is dissolved in 3 mL ultrapure water and stirred for 30 min. (step 118) so that the AuNS/pulp catalyst can become the form of pulp 120. Secondly, the 4-NP solution (1 mM, 5 mL) and fresh NaBH4 solution (0.1 M, 5 mL) that was refrigerated are added to a vial and mixed together (step 122). Then, the mixed solution is added into the pulp (step 124) suspension rapidly while keeping vigorous stirring until the reaction is finished (step 126). Afterward, 100 μL mixed solutions 128 were pipetted into a 96 well microplate (Thermo Fisher Scientific, America). The absorbance spectra of the solutions in the microplate were characterized by a multi-mode microplate reader (Microplate Reader M3, Molecular Devices, San Jose, Calif.). The remaining fraction of 4-NP (X) was calculated by Equation (2).

$$X = Ct/C0 \times 100\% \qquad \text{Eq. (2)}$$

where C0 was the initial 4-NP concentration and Ct was the concentration at a different time interval (t). Furthermore, the AuNS/pulp catalyst was recycled 16 times to investigate the reusability. For each recycling, the used catalyst is washed, centrifuged and dried for the next experiment (step 128).

A similar procedure was used to investigate the catalytic efficiency of the s-PAT-supported AuNS/pulp catalyst by its application in the 2-NA conversion to o-phenylenediamine (OPD). $NaBH_4$ and 2-NA aqueous solutions in ultrapure water were prepared with 0.4 M and 4 mM, respectively. The NaBH4 aqueous solution was into the refrigerator for standby application. Firstly, the appropriate Au/CP catalyst was dissolved in 3 mL ultrapure water and stirred for 30 min so that the catalyst could become the pulp. Secondly, the 2-NA solution (4 mM, 5 mL) and $NaBH_4$ solution (0.4 M, 5 mL) were added to the vial and mixed together. Thirdly, the mixed solution was added into the pulp rapidly and kept the vigorous stirring. Afterwards, 100 μL mixed solutions were pipetted into 96 well microplates (Thermo Fisher Scientific, America). The microplate was placed in a UV-visible spectrophotometer (Microplate Reader M3, Molecular Devices, San Jose, Calif.) to measure the absorbance spectra. The remaining fraction of 2-NA (X) was calculated by Equation (2) above.

The AuNS/pulp catalyst was recycled six times to investigate the reusability. For each recycling, the used catalyst is washed, centrifuged and dried for the next experiment.

X-ray diffraction (XRD) patterns were obtained on an X-ray diffractometer (Empyrean Series 2, PANalytical, Netherlands). The scan speed was 5°·min⁻¹ and the 2θ scans covered 10~85°. The microstructural nature was investigated using the field emission instrument scanning electron microscope (S-4800, Hitachi, Japan). The element distribution was investigated by the electron mapping. Fourier transform infrared (FT-IR) spectra detection was performed using a Nicolet Nexus 670 series FT-IR spectrophotometer in an ATR mode. The spectra were recorded under ambient conditions over the range of 750-4000 cm−1 with a resolution of 0.5 cm⁻¹.

The thermogravimetric analysis was measured by a TGA system (Mettler Toledo International Inc, America). Before the test, the sample was dried at 80° C. for 2 h and the ceramic crucible was pretreated by a high-temperature sintering process. The 0.5 mg sample was placed in the ceramic crucible and kept on the auto-sampler of the TGA system. Then the sample was heated from 30° C. to 800° C. at a 5° C.·min⁻¹ heating rate. The gas flow rate of the nitrogen atmosphere was 20 mL·min⁻¹.

The X-ray photoelectron spectroscopy (XPS) patterns were acquired by the PHI 5600 spectrometer with a hemispherical energy analyzer (Mg-Kα radiation, 1253.6 eV at 100 Watts), and the vacuum degree was maintained at 10⁻⁷

Pa. The samples were dried at 80° C. for 24 h to remove moisture and then were tested without surface treatment. The curve fitting was performed by utilizing XPSPEAK 4.1 with a Shirley-type background.

Figure 3B:
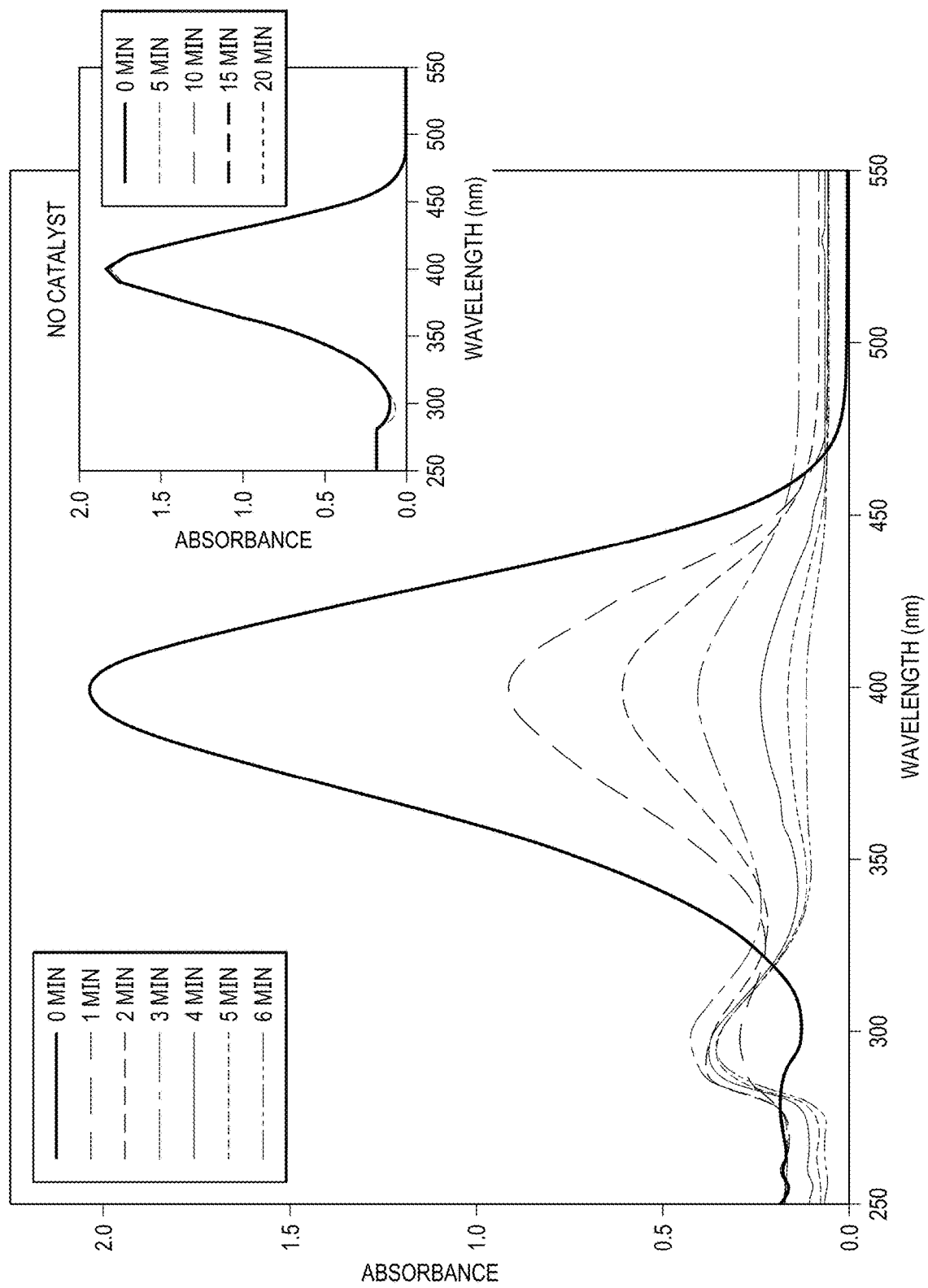
FIG. 3(b) depicts UV-vis absorption spectra of the 4-NP reduction in the presence of 27 mg AuNS/pulp catalyst.
Figure 3C:
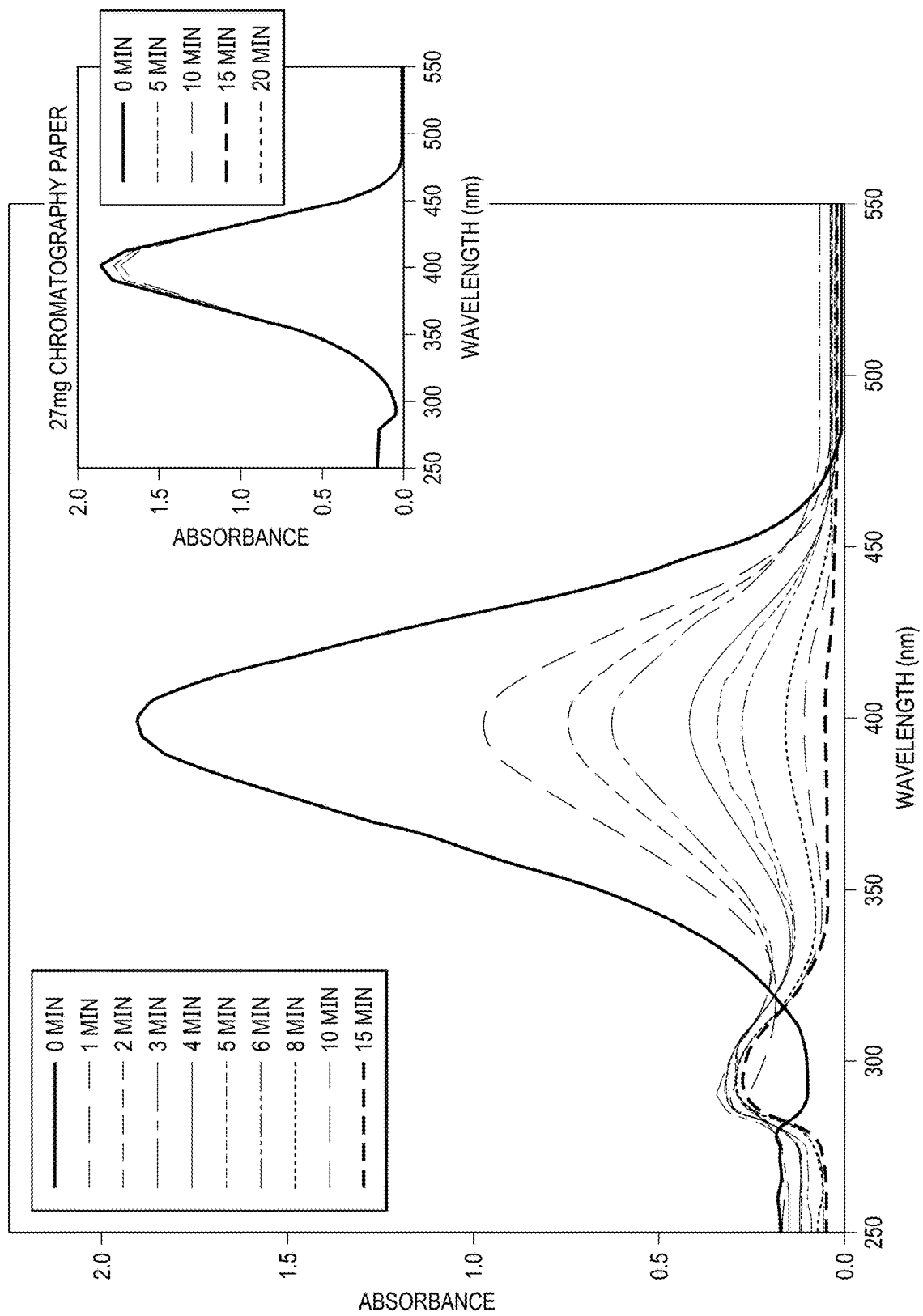
FIG. 3(c) depicts UV-vis absorption spectra of the 4-NP reduction in the presence of 13 mg AuNS/pulp catalyst.

In an experiment of the catalytic reduction of 4-NP, the yellow color of a 4-NP/NaBH4 solution faded and bleached ultimately with the addition of the s-PAT supported AuNS/pulp catalyst. The fading time which was related to the catalytic reduction of 4-NP to 4-AP could decrease with the increase of the catalyst amount, and thus the effect of the catalyst amount was investigated by the UV-Vis spectrophotometry (see FIGS. 3(a)-3(d)). As shown in FIGS. 3(a)-3(d), the intensity of the representative peak of 4-NP in the presence of NaBH4 at 400 nm decreased and that of the representative peak of 4-AP at 295 nm increased gradually with time. The insets in FIGS. 3(b) and 3(c) show the spectra of the solution in the absence of the AuNS/pulp catalyst and AuNS (i.e. only in the presence of paper but not AuNS). It was confirmed from the literature that the peaks at 400 nm and ~295 nm represented 4-NP and 4-AP, respectively. However, there were no obvious spectral changes at 400 nm in the absence of the AuNS/pulp catalyst or only in the presence of the chromatography paper (i.e. no AuNS) in the reaction solution (FIG. 3(b) and FIG. 3(c) insets), though a slight decrease in FIG. 3(c) was observed at the beginning of the reaction due to the physical adsorption on the porous paper material. That is, the spectral change was due to the transformation from 4-NP to 4-AP when the AuNS/pulp catalyst was added into the 4-NP/NaBH4 solution. The visual inspection of this experiment also shows that the color of the 4-NP/NaBH4 solution had no changes for a few days in the absence of the catalyst, indicating that the transformation from 4-NP to 4-AP could not occur in the presence of NaBH4 alone, as confirmed by the literature. It was reported that the transformation from 4-NP to 4-AP was favorable thermodynamically but unfavorable kinetically without the catalyst. In other words, the pristine chromatography paper had no catalytic activity and AuNS was the principal active component for the AuNS/pulp catalyst for the 4-NP degradation.

Figure 3D:
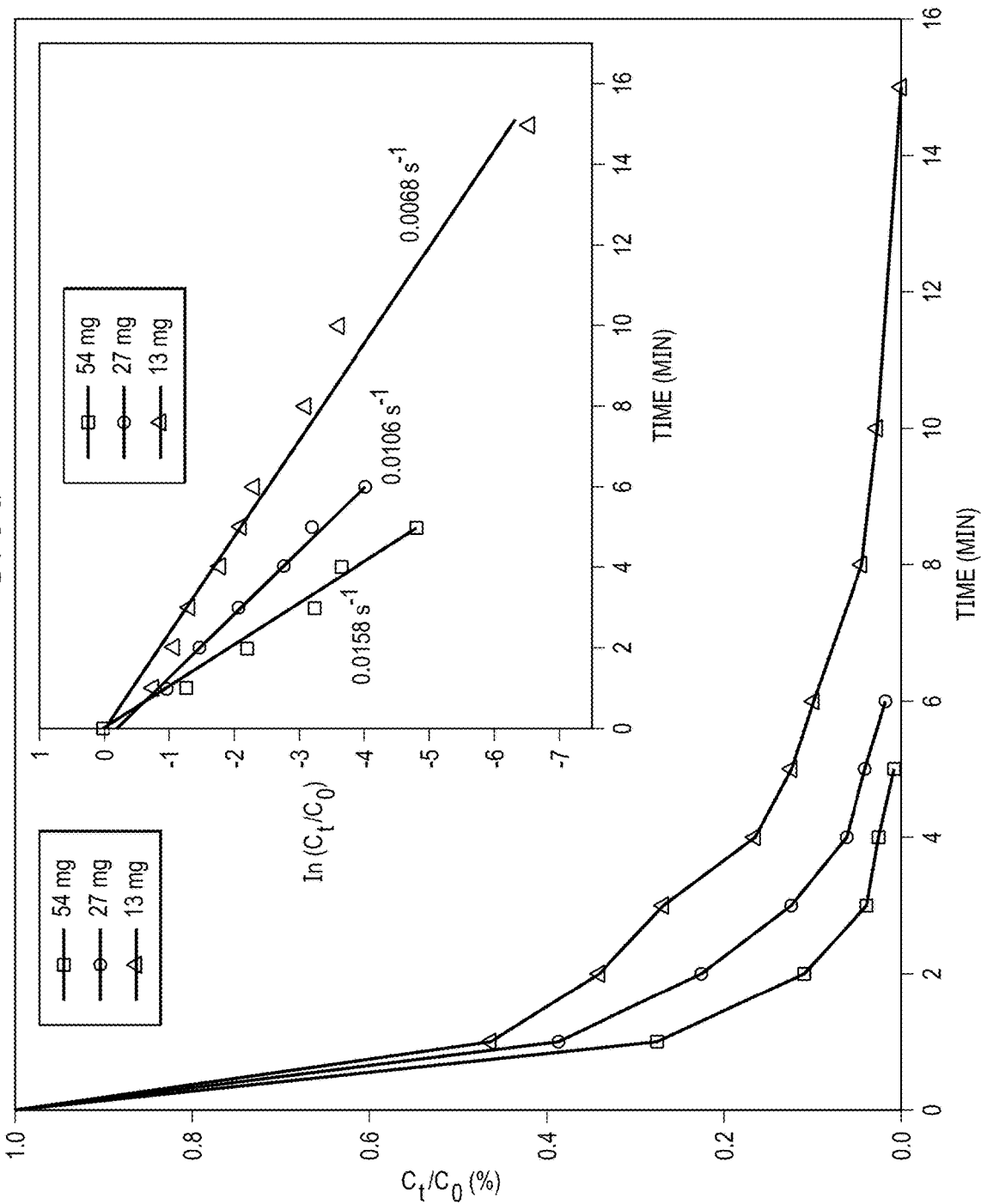
FIG. 3(d) depicts UV-vis absorption spectra of the 4-NP reduction in the presence of Ct/C0 vs. time plot.
Figure 4:
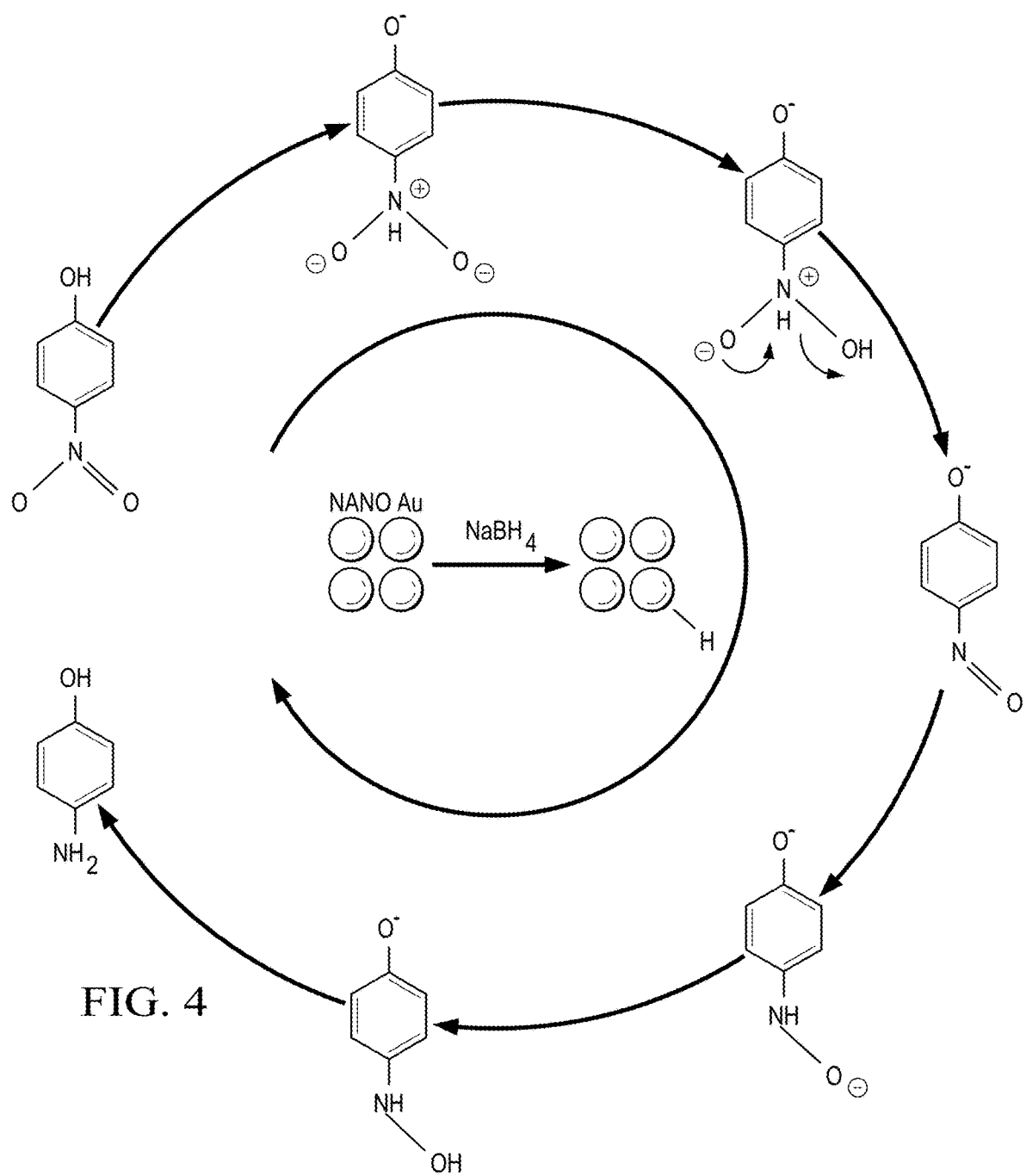
FIG. 4 depicts a proposed reaction mechanism of 4-NP transformation to 4-AP.

The transformation from 4-NP to 4-AP is a six-electron process in the presence of NaBH4. According to experiments and the literature, a proposed possible reaction mechanism is illustrated in FIG. 4. AuNPs on the chromatography paper transfer NaBH4 to active hydrogen species adsorbed on the catalyst surface. Afterward, the nitro groups of 4-NP molecules in the interfacial region would be transferred to amino groups with the induction of the adsorbed hydrogen species. As seen from FIG. 4, the AuNS is the key active component and the AuNS amount plays an important role in the catalytic reduction reaction. Therefore, the catalytic efficiency decreased gradually when the AuNS/pulp amount reduced from 54 to 13 mg. FIG. 3(d) shows the 4-NP conversion over time with different amounts of the catalyst. The conversion rate reached 89.1% within 2 min and nearly 100% within 5 min when the amount of AuNS/pulp catalyst was 54 mg. This conversion rate was outstanding and higher than that of many previous reports. When the amount of the AuNS/pulp catalyst decreased to 27 mg, the catalyst still exhibited satisfactory catalytic reactions and the conversion rate could still reach 98.3% within 6 min. The high catalytic efficiency of the AuNS/pulp catalyst was largely attributed to the uniform distribution of the AuNS catalyst in solutions by the pulp phase of the s-PAT (instead of the solid paper phase), whereas solid phase catalysts often fail to achieve high efficiency because of this reason. More detailed comparison of the catalytic efficiency between the pulp phase and the paper phase are discussed below.

The catalytic reduction reaction from 4-NP to 4-AP follows the first order kinetic because of the excessive amount of NaBH4. The kinetic is calculated by Equation (3).

$$Ln(Ct/C0)=-kt \qquad \text{Eq. (3)}$$

where C0 is the initial 4-NP concentration, Ct is the concentration at different time intervals (t) and k is the apparent rate constant of the reaction.

FIG. 3(d) indicates the first order kinetic curves of 4-NP over AuNS/pulp with different catalyst amounts. It can be seen that the data points follow the linearity basically, which was slightly different from previous literature. This was due to vigorous stirring during the period of catalytic reactions in our experiment so that the bubbles produced in the reaction vial could be eliminated in time, preventing bubbles from blocking the interaction between the catalyst and reactants. Furthermore, the catalytic performance improved with the increase of AuNS amount so that the value of k was 0.0158, 0.0106 and 0.0068 $s^{-1}$ for 54, 27 and 13 mg catalysts, respectively. However, considering the efficiency and the cost, 27 mg was chosen as the optimum catalyst amount.

To investigate the effect of the NaBH4 concentration on catalytic activities, UV-Vis absorption spectra from different NaBH4 concentrations were collected and the resulted results are shown in FIG. 5(a)-5(d) and FIG. 6. As shown in FIGS. 5(a)-5(d), the reaction time increased gradually with the decrease of the NaBH4 concentration.

Figure 5A:
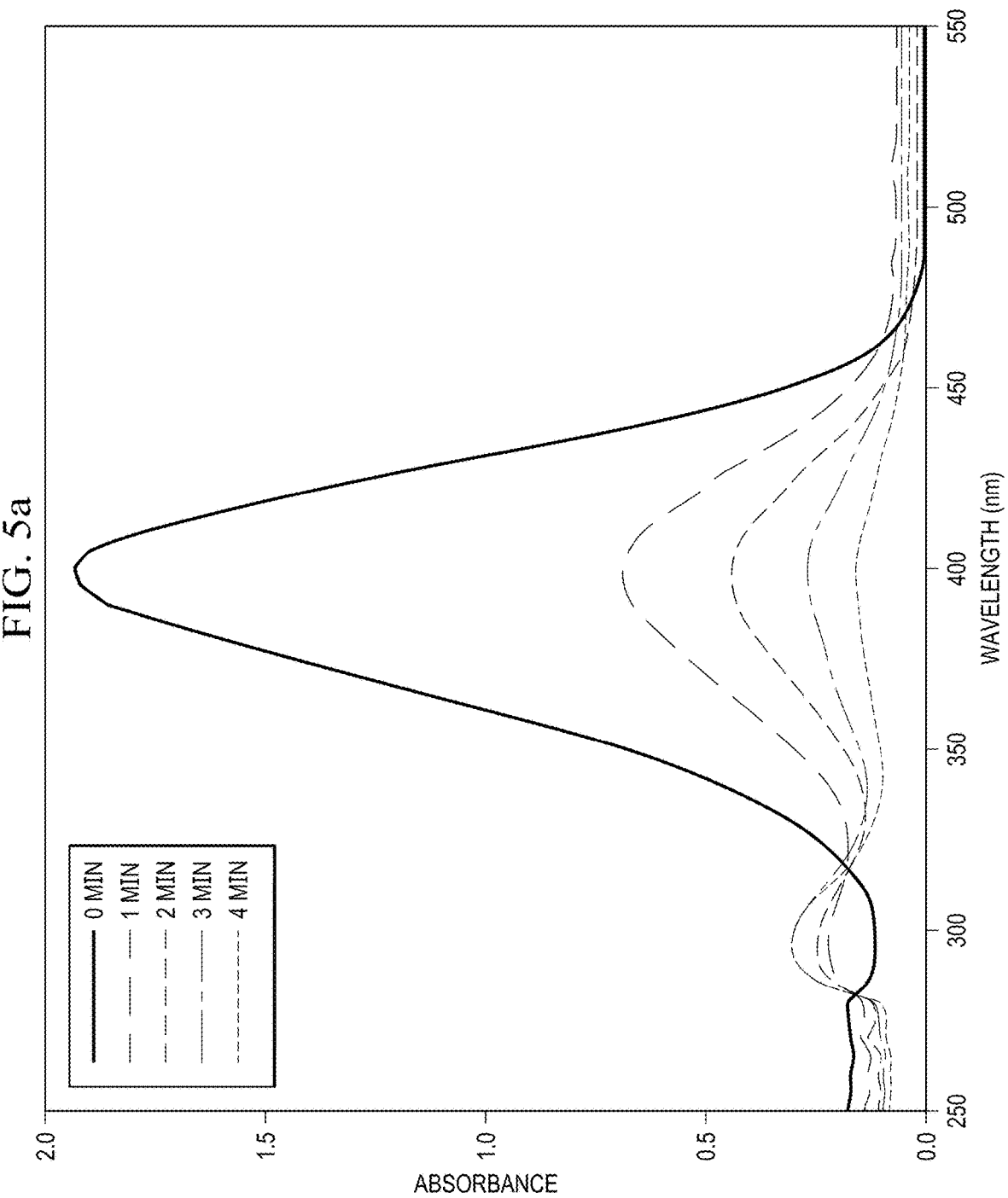
FIG. 5(a) depicts UV-vis absorption spectra of the 4-NP reduction (1 mM) in the presence of 0.20 M $NaBH_4$.
Figure 5C:
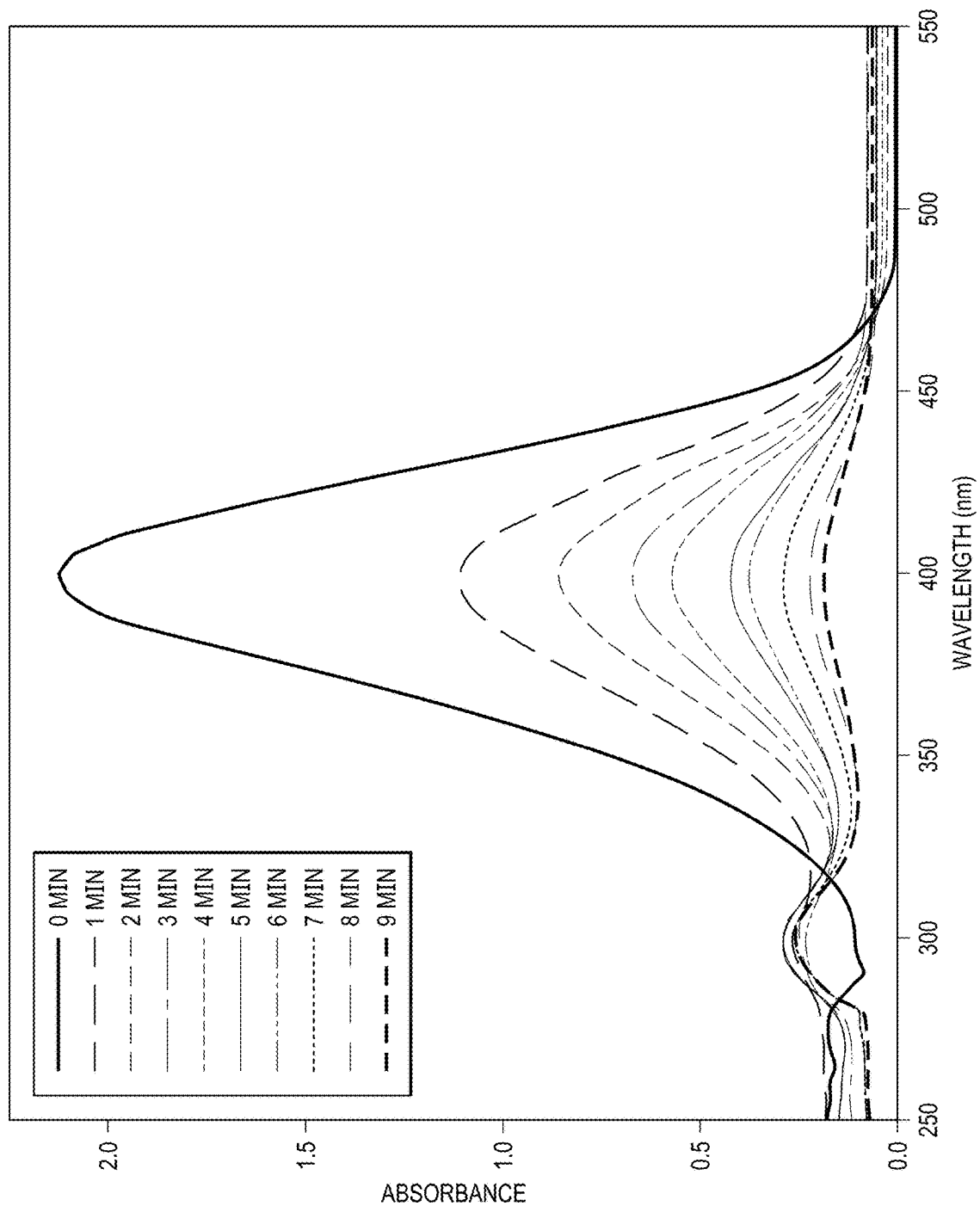
FIG. 5(c) depicts UV-vis absorption spectra of the 4-NP reduction (1 mM) in the presence of 0.05 M $NaBH_4$.
Figure 5D:
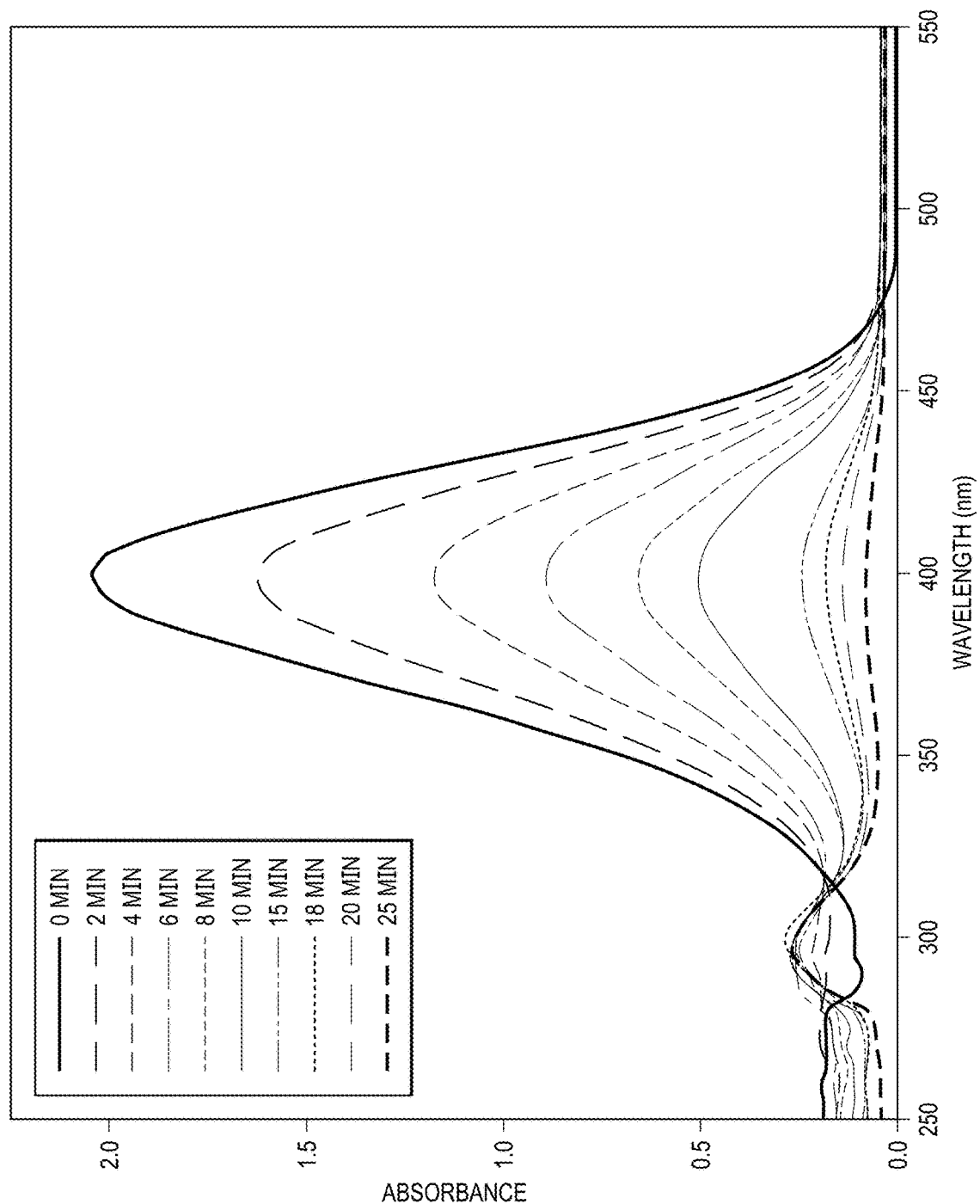
FIG. 5(d) depicts UV-vis absorption spectra of the 4-NP reduction (1 mM) in the presence of 0.01 M $NaBH_4$.

FIG. 5(d) shows that when the concentration of NaBH4 was 0.01 M, the catalytic efficiency was very low. It took about 25 min to complete the reaction. As shown in FIG. 5(c), when increasing the NaBH4 concentration from 0.01 M to 0.05 M (That is, the NaBH4/4-NP molar ratios were 10 to 50, respectively), the reaction time decreased to 9 min. Nevertheless, when increasing the NaBH4/4-NP molar ratio higher than 100, the increase of the molar ratio did not have an obvious effect on the catalytic efficiency. For example, when the NaBH4 concentrations were 0.20 M (shown in FIG. 5(a)) and 0.10 M (shown in FIG. 5(b)) (the molar ratios were 200 and 100), their corresponding reaction times were 4 and 6 min, respectively.

Figure 6:
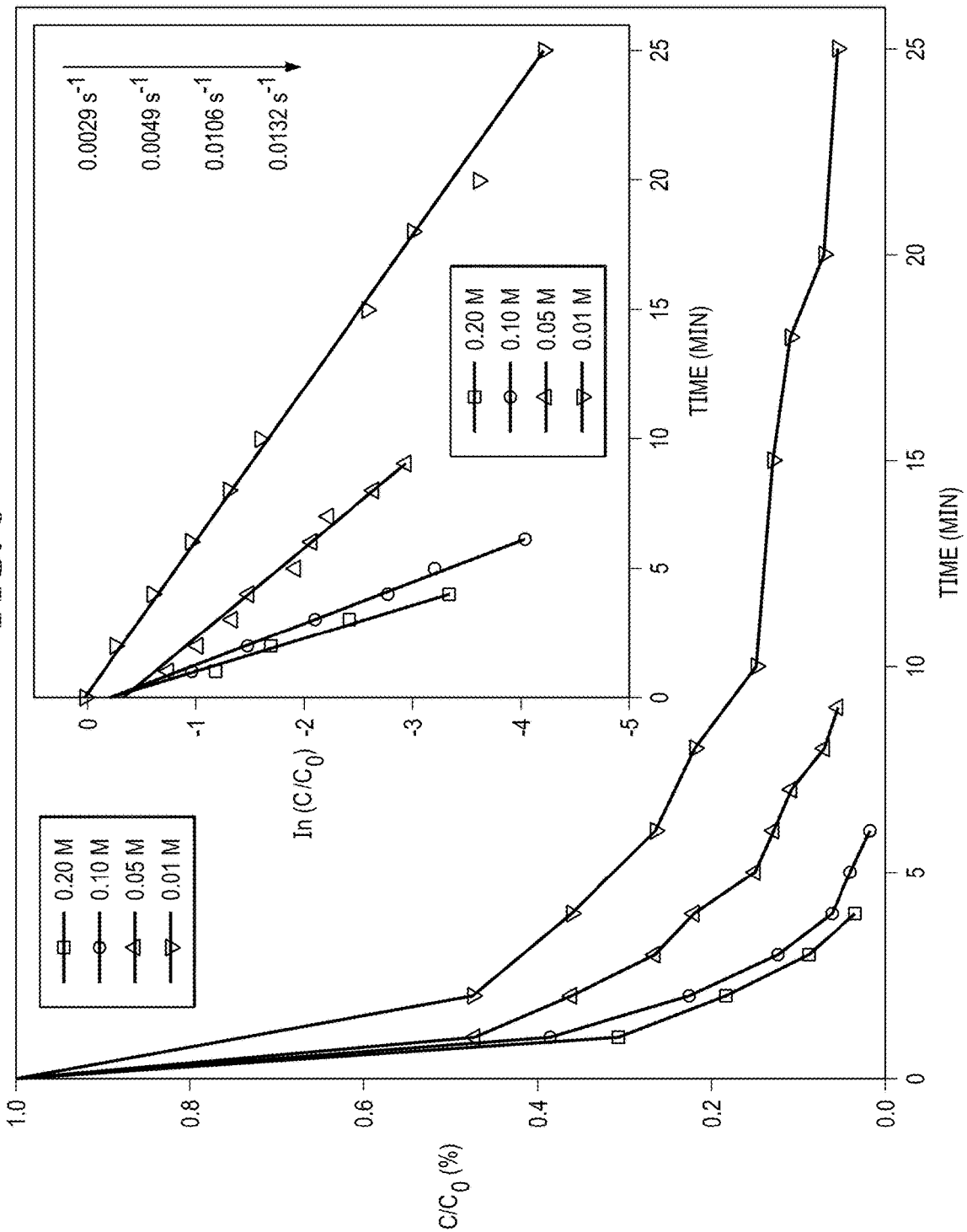
FIG. 6 depicts the Ct/C0 vs. time plot in the presence of different concentrations of $NaBH_4$ over the AuNS/pulp catalyst.

FIG. 6 displays the first order kinetic curves of 4-NP over AuNS/pulp with different NaBH4 concentrations. It can be observed that the NaBH4 concentration can affect the catalytic efficiency significantly, especially when the molar ratio is less than 100. The value of k increased from only 0.0029 $s^{-1}$ to 0.0049 $s^{-1}$, when the concentration of NaBH4 was increased from 0.01 to 0.05 M.

Figure 7A:
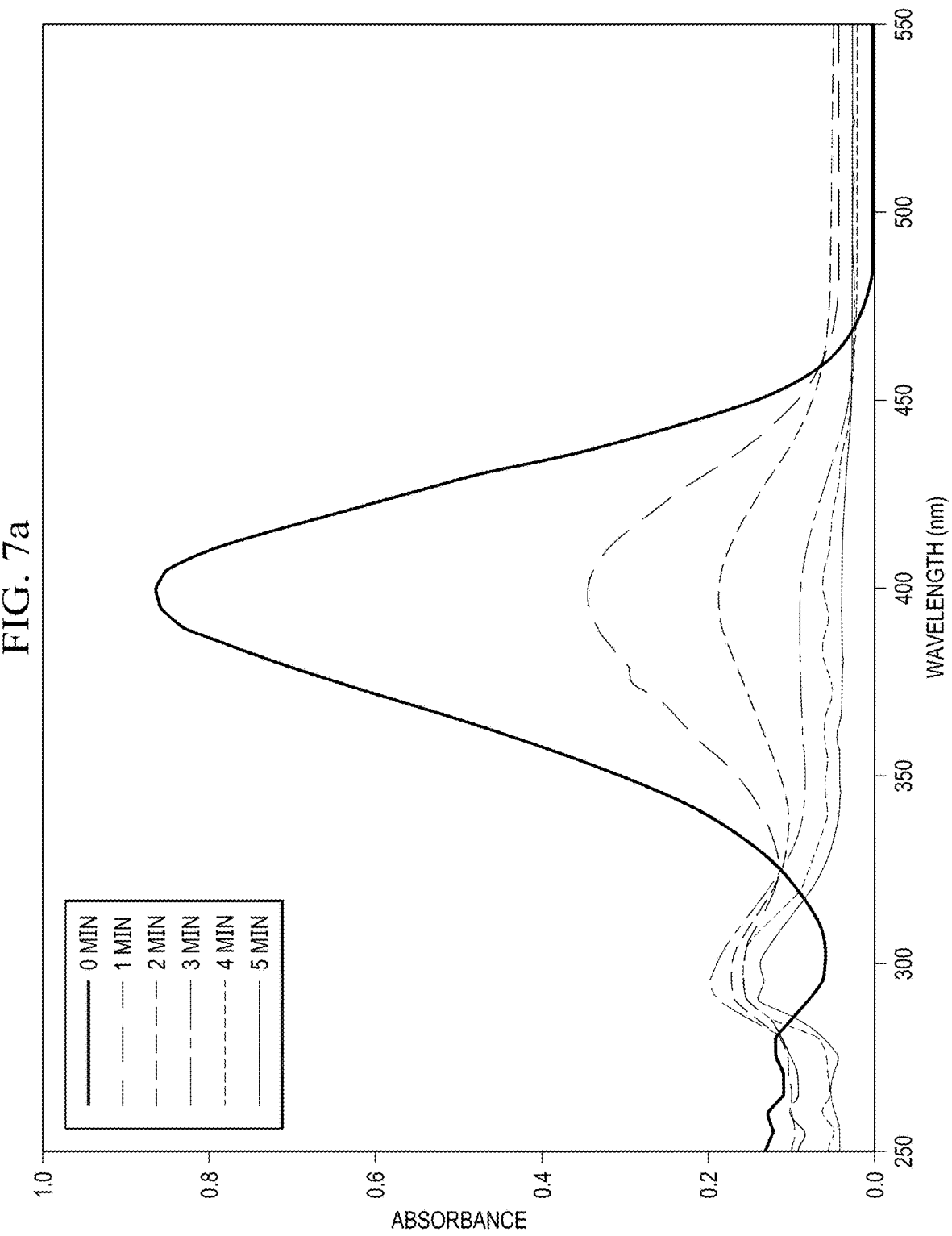
FIG. 7(a) depicts UV-vis absorption spectra of the 4-NP reduction in the presence of 0.5 mM 4-NP. $NaBH_4$, 0.01M.
Figure 7B:
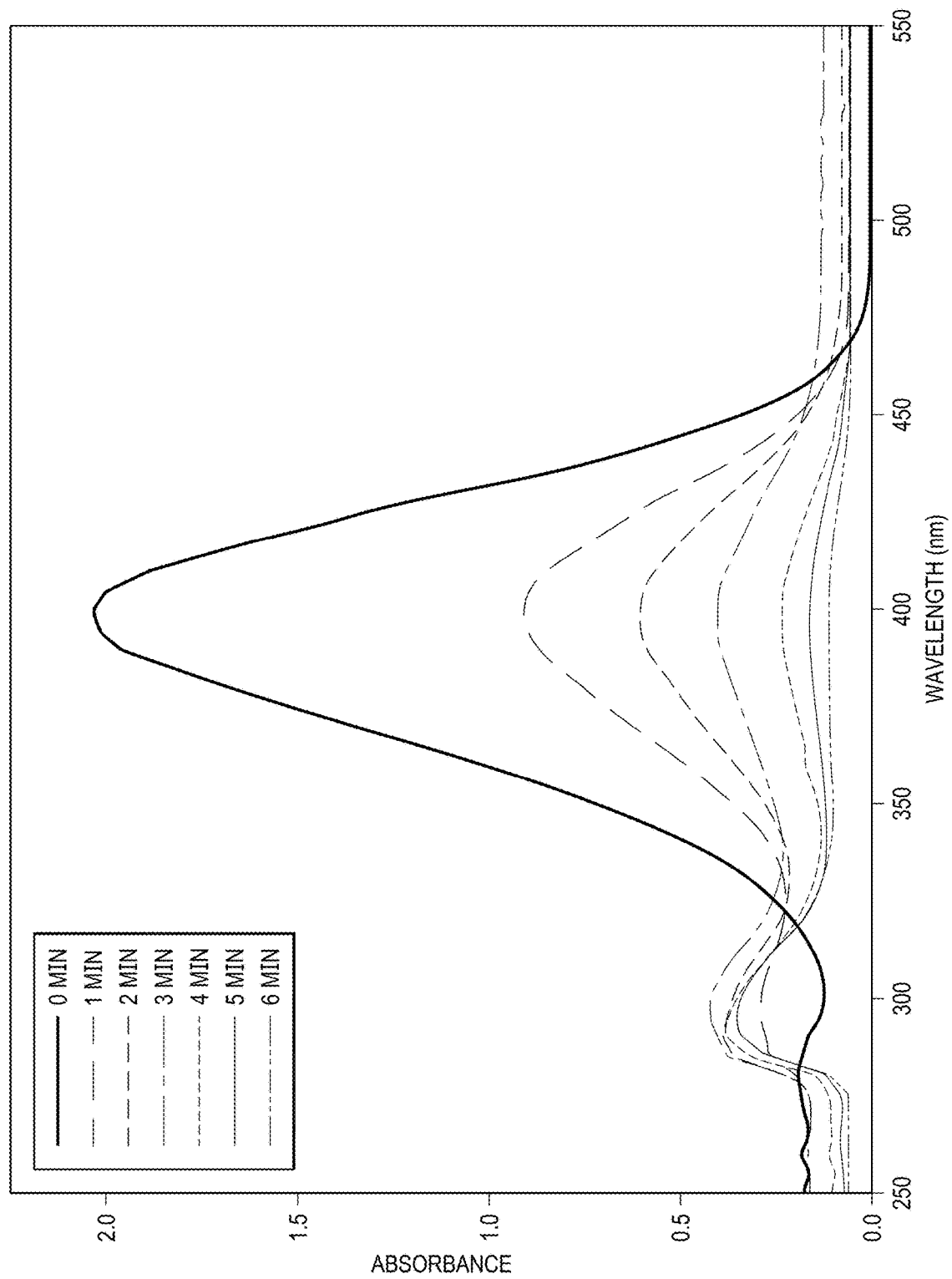
FIG. 7(b) depicts UV-vis absorption spectra of the 4-NP reduction in the presence of 1.0 mM 4-NP. $NaBH_4$, 0.01M.
Figure 7C:
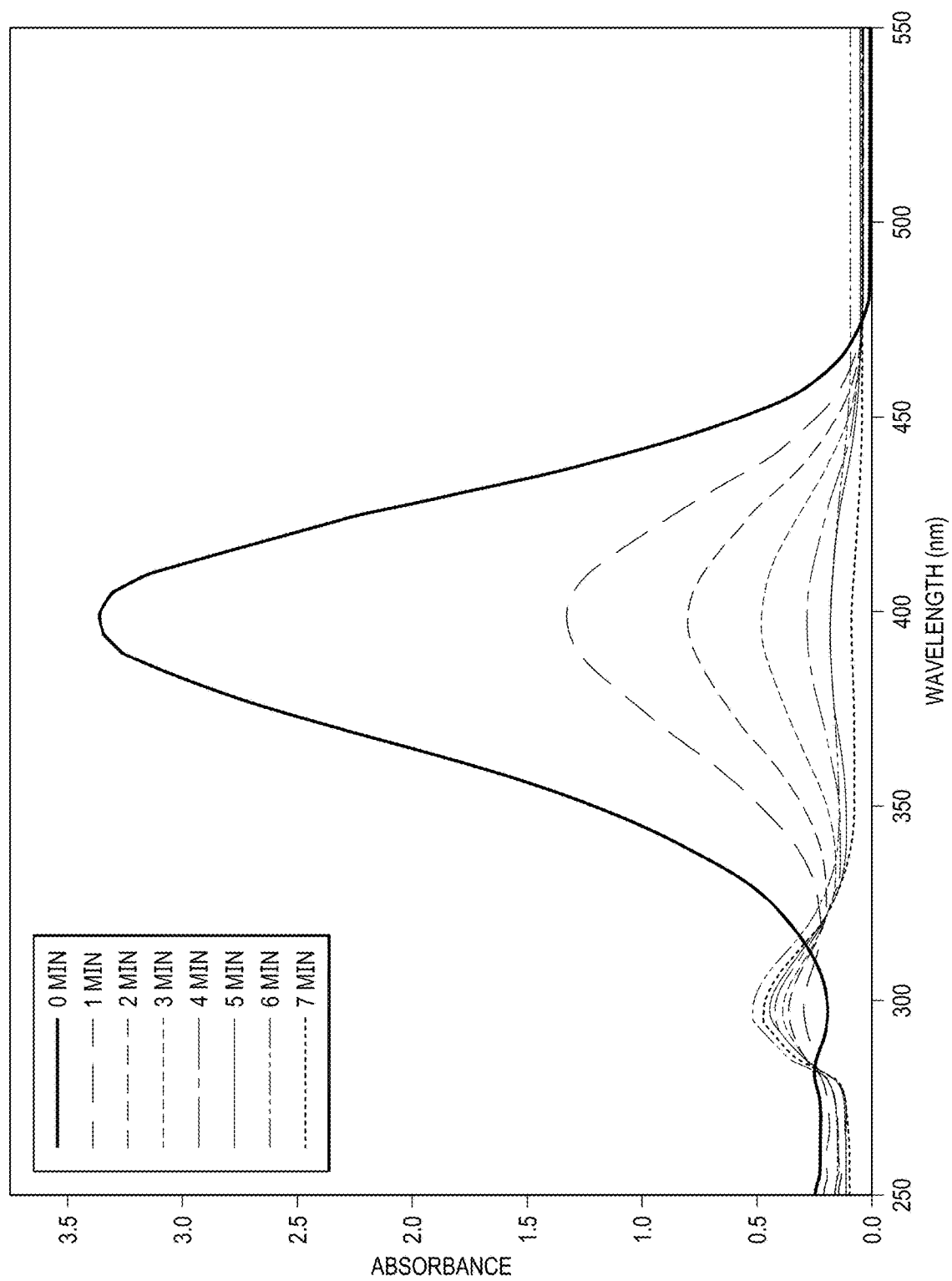
FIG. 7(c) depicts UV-vis absorption spectra of the 4-NP reduction in the presence of 2.0 mM 4-NP. $NaBH_4$, 0.01M.

On the other hand, no great changes are observed with the increase of the 4-NP concentrations. FIGS. 7(a)-7(c) depicts UV-vis absorption spectra of the 4-NP reduction in the presence of (a) 0.5 mM, (b) 1.0 mM and (c) 2.0 mM 4-NP. NaBH4, 0.01M, respectively. The reaction time difference is only within 1-2 min. when the 4-NP concentration increases exponentially. In other words, the NaBH4 concentration, instead of 4-NP concentration, is the main influence factor when other conditions are the same. Therefore, it can be speculated that the first step of the transformation from 4-NP to 4-AP (Au transferred NaBH4 to active hydrogen species) was the key process to control the reaction time during the catalytic reduction (see FIG. 4).

Although solid phase catalysts can be readily recycled for high reusability, it may take long time for reactants to reach the catalyst surface, thus resulting in lower catalytic efficiency than liquid phase catalysts. The s-PAT transformation of the paper phase to the pulp phase enables uniform distribution of catalysts in a solution, providing solid phase catalysts a smart strategy for high-efficiency catalysis. Table 1 lists the correlated data of the 4-NP reduction under different conditions. As well known, both the catalytic efficiency and the economic cost would increase correspondingly with more catalyst amounts and higher NaBH4 concentrations. The increase of the 4-NP concentration can reduce the economic cost, but it would increase the reaction time. Considering both catalytic efficiency and economic factors, 27 mg of the catalyst (containing 10 mg Au), 0.10 M NaBH4 and 1 mM 4-NP were used as optimum conditions. Under optimal conditions, the conversion rate could reach 95% within 4.5 min and nearly 100% within 6 min. In comparison with reported data for the catalytic reduction of 4-nitrophenol using solid phase catalysts, as shown in Table 2, the k value of AuNS/pulp was 0.0106 $s^{-1}$, which was higher than those in previously reported data. As shown in FIG. 3(d), if increasing the catalyst amount or the NaBH4 concentration, higher catalytic efficiency and k values would be achieved. Furthermore, our AuNS/pulp catalyst reduced much more amount of 4-NP in the catalytic reduction, and the catalyst could maintain high catalytic efficiency even after many recycling times, which is another significant advantage of our s-PAT supported AuNS/pulp catalyst (discussed below). All these features indicate that our s-PAT supported catalyst exhibits excellent catalytic performance for the 4-NP reduction.

TABLE 1

The correlated data of the 4-NP reduction with different conditions

| Number | Catalyst amount (mg) | Au amount (mg) | NaBH4 concentration (M) | 4-NP concentration (mM) | $t_{95\%}$ (min) | $k(s^{-1})$ |
|---|---|---|---|---|---|---|
| 1 | 54 | 20 | 0.10 | 1 | 3 | 0.0158 |
| 2 | 27 | 10 | 0.10 | 1 | 4.5 | 0.0106 |
| 3 | 13 | 5 | 0.10 | 1 | 8 | 0.0068 |
| 4 | 27 | 10 | 0.01 | 1 | 25 | 0.0029 |
| 5 | 27 | 10 | 0.05 | 1 | 10 | 0.0049 |
| 6 | 27 | 10 | 0.20 | 1 | 3.7 | 0.0132 |
| 7 | 27 | 10 | 0.10 | 0.5 | 3 | 0.0188 |
| 8 | 27 | 10 | 0.10 | 2 | 6 | 0.0133 |

$t_{95\%}$ refers to the time when the catalytic efficiency is higher than 95%.

TABLE 2

Comparison of the reduction of 4-nitrophenol over AuNS/pulp with reported data.

| Catalyst | t (min) | k ($s^{-1}$) | 4-NP (μmol) | Ref. |
|---|---|---|---|---|
| AuNS/pulp | 6 | $10.6 \times 10^{-3}$ | 5 | This work |
| Au/Co3O4 | 10 | $5.0 \times 10^{-3}$ | 4 | 48 |
| Pd/TiO2 | 6 | $10.0 \times 10^{-3}$ | 0.6 | 49 |
| Au/TiO2 | 6 | $10.5 \times 10^{-3}$ | 1 | 47 |
| Graphene/PDA-Au | 13 | $3.7 \times 10^{-3}$ | 1 | 50 |
| Ag/CH-FP | 12 | $3.9 \times 10^{-3}$ | 2 | 34 |
| Ni@PtNi NCs-rGO | 10 | $4.5 \times 10^{-3}$ | 0.5 | 51 |

Similar results (not shown) were obtained for 2-NA reduction. The conversion rate could reach 95.0% within 2 min and 99.0% within 3 min when the amount of AuNS catalyst was 27 mg. The catalytic efficiency decreased gradually when the AuNS amount reduced. However, the conversion rate could also reach 95.0% within 4 min when the amount of AuNS catalyst was 9 mg, which was still excellent for the catalytic reduction. In consideration of catalytic and economic efficiency, the 27 mg catalyst (contain about 8.6 mg Au) were optimum amount. In addition, the catalytic reduction reaction from 2-NA to OPD followed the first order kinetic because of too much excess amount of NaBH4. The catalytic performance improved with the increase of AuNSs amount so that the k value was 0.0255, 0.0177 and 0.0120 $s^{-1}$ for 27, 18 and 9 mg catalysts, respectively.

Table 3 shows the comparison of reduction of 2-NA over AuNS with reported data. The k value of Au/CP was 0.0249 $s^{-1}$, which was higher than previously reported data.

TABLE 3

Comparison among this work and previous work.

| No. | Catalyst | T (° C.) | t (min) | k ($s^{-1}$) | Ref. |
|---|---|---|---|---|---|
| 1 | Ni@Au/KCC-1 | RT | 11 | 0.0043 | [47] |
| 2 | Nano-gold particles | RT | 13 | 0.0014 | [43] |
| 3 | Ba/Alg/CMC/Au-NPs | RT | 5 | 0.0223 | [48] |
| 4 | Au/RGO-based hybrid hydrogel | RT | 4.5 | — | [49] |
| 5 | Cu-Acac@Am—Si—Fe3O4 | 27 | 5 | 0.0180 | [50] |
| 6 | Au/CP | RT | 3 | 0.0249 | This work |

As mentioned above, the s-PAT can be easily switched between the pulp and the solid paper phases. Because paper is a porous material, it has been used to support various nanomaterials to increase reaction kinetics or used as a carrier for other related applications. For instance, the paper supported Ag took advantages of the porous characteristic and exhibited impressive catalytic performance. To confirm the superior performance of the s-PAT than the solid paper, we also compared different catalytic performances in the 4-NP catalytic reduction between the s-PAT supported AuNS/pulp and the solid paper supported AuNS/paper.

Figure 8B:
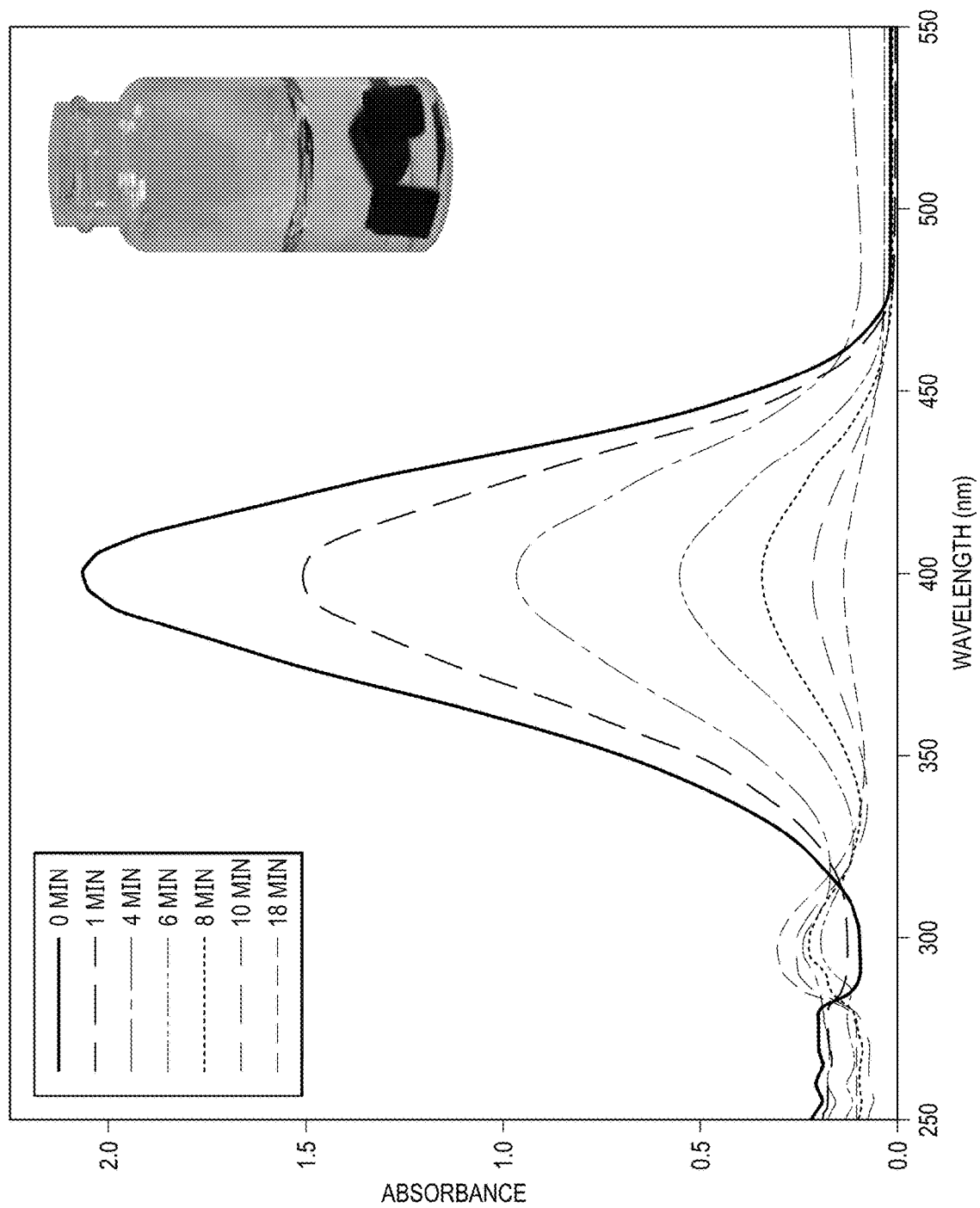
FIG. 8(b) depicts UV-vis absorption spectra of the 4-NP reduction by AuNS/paper catalyst.
Figure 8C:
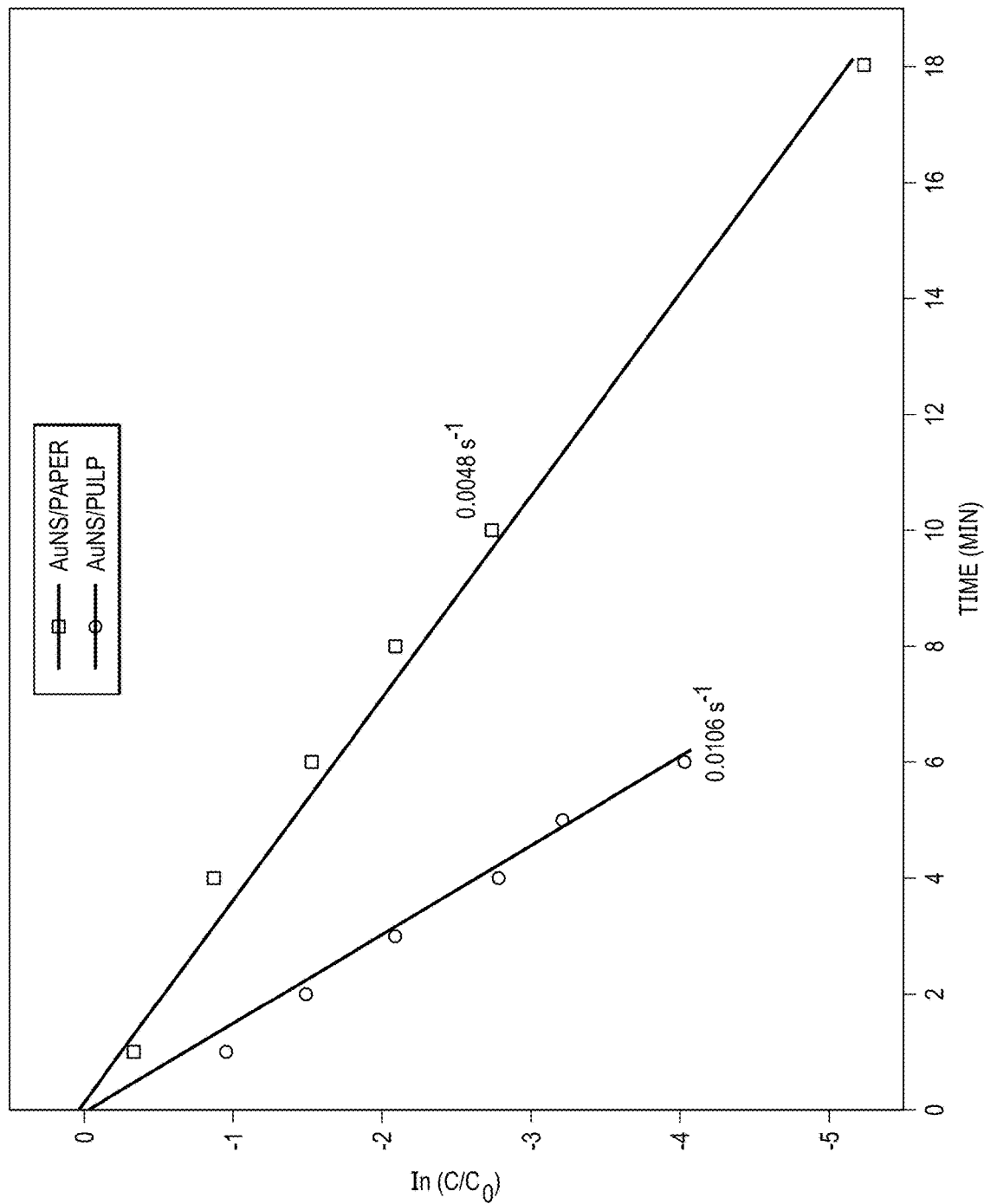
FIG. 8(c) depicts respective Ln(Ct/C0) vs. time plot of the 4-NP reduction by AuNS/pulp and AuNS/paper catalysts.
Figure 9A:
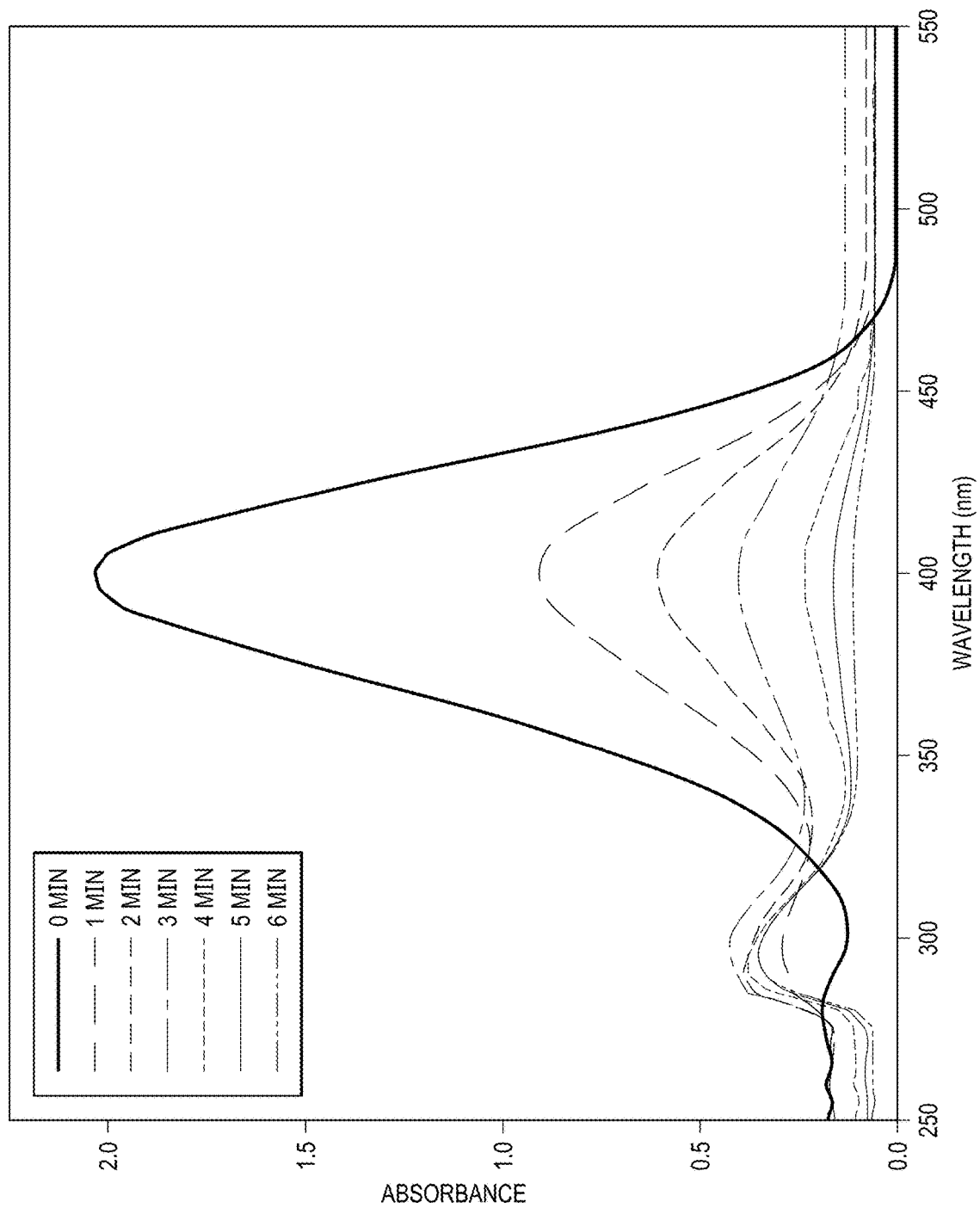
FIG. 9(a) depicts UV-vis absorption spectra of the 4-NP reduction with different recycling times ranging from (a) the first time, (b) the fifth time, (c) the tenth time to (d) the fifteenth time.
Figure 9B:
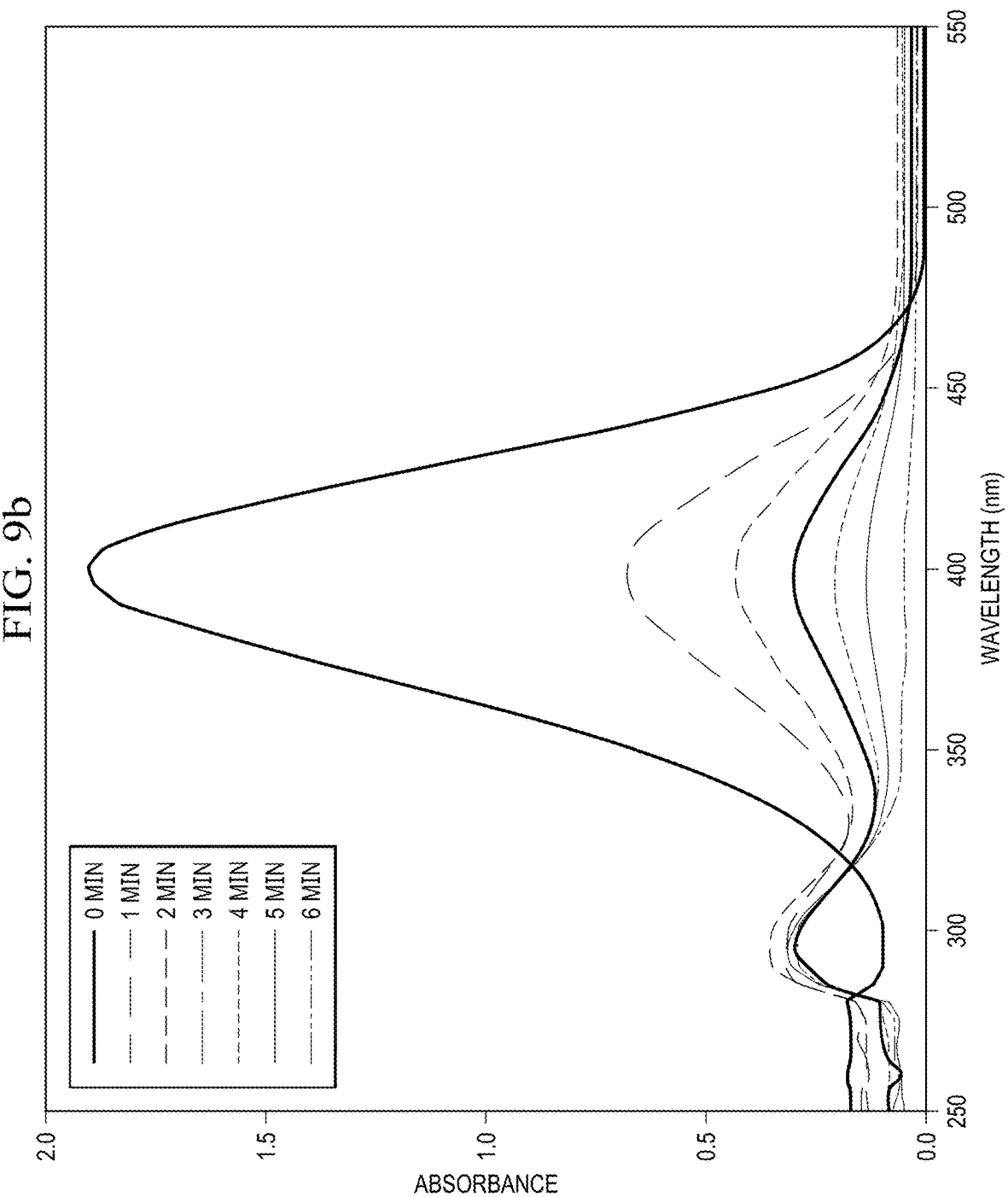
FIG. 9(b) depicts UV-vis absorption spectra of the 4-NP reduction with different recycling times ranging from (a) the first time, (b) the fifth time, (c) the tenth time to (d) the fifteenth time.
Figure 9C:
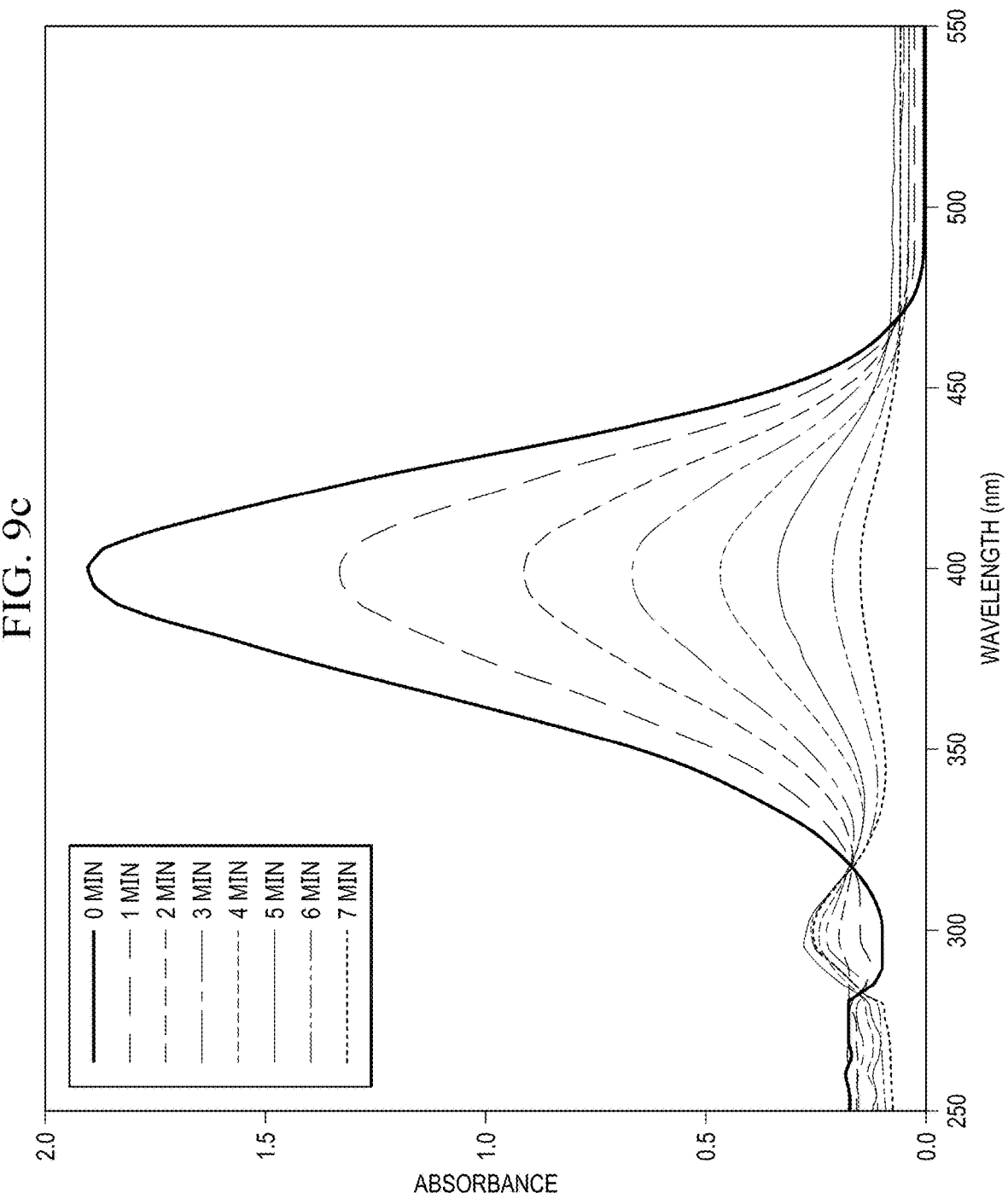
FIG. 9(c) depicts UV-vis absorption spectra of the 4-NP reduction with different recycling times ranging from (a) the first time, (b) the fifth time, (c) the tenth time to (d) the fifteenth time.
Figure 9D:
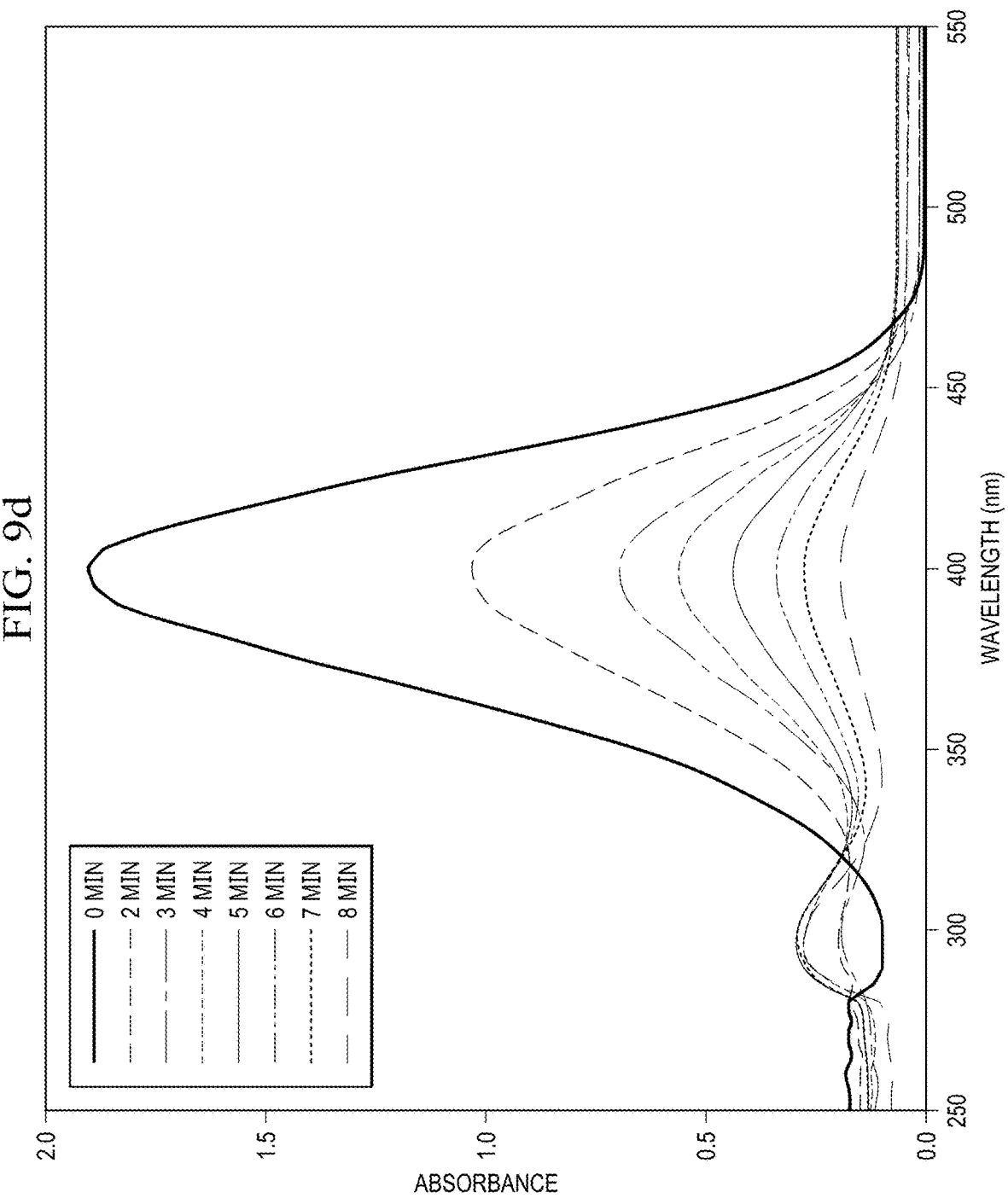
FIG. 9(d) depicts UV-vis absorption spectra of the 4-NP reduction with different recycling times ranging from (a) the first time, (b) the fifth time, (c) the tenth time to (d) the fifteenth time.

FIGS. 8(a)-8(c) display different UV-vis absorption spectra of the 4-NP reduction by the AuNS/pulp and AuNS/paper catalysts. FIGS. 8(a) and 8(b) depict UV-vis absorption spectra of the 4-NP reduction AuNS/pulp and AuNS/paper catalysts, respectively. FIG. 8(c) depicts respective Ln(Ct/C0) vs. time plot of the 4-NP reduction by AuNS/pulp and AuNS/paper catalysts. The insets in FIGS. 8(a) and 8(b) are photographs of the catalytic reaction systems in the presence of different catalysts. AuNS/pulp enabled the high uniformity of catalyst distribution in solutions than AuNS/paper.

It can be seen that the 4-NP reduction was completed within 6 min by using AuNS/pulp, whereas it needed 18 min to finish in the presence of AuNS/paper, which implies that the catalytic efficiency of the s-PAT supported AuNS/pulp is 300% as high as the solid phase Au/paper catalyst. The AuNS/pulp could be evenly suspended in the whole reaction solution so that it significantly improved the chances of its contact with 4-NP in the solution, while the 4-NP reaction in FIG. 3(b) was limited by the regionally localized AuNS catalyst on paper which sank at the bottom of the solution. Therefore, even though they contained the same amount of Au, the s-PAT-supported AuNS/pulp made full use of the AuNS catalyst. In contrast, AuNS/paper could not function in its full catalytic activity due to its restriction within limited space in the solution. That is to say, more active sites in the AuNS/pulp were involved in the 4-NP reduction. According to the ln(Ct/C0) vs. time plot from FIG. 8(c), the k value (0.0106 $s^{-1}$) for AuNS/pulp was 2.2 folds higher than that for AuNS/paper (0.0048 s$^{-1}$), further indicating superior catalytic performance of the s-PAT supported AuNS/pulp to AuNS/paper.

As discussed above, liquid phase catalysts usually provide high catalytic efficiency (such as Au/Fe3O4@TiO2, Ag@carbon), but it is extremely challenging to separate them from wastewater and recycle them to reuse. However, both catalytic efficiency and reusability are important for industrial applications. When the AuNS/pulp catalyst is dried and transformed into the paper phase, the catalyst can be easily separated from wastewater for reuse, ensuring high reusability. Therefore, after investigating the high efficiency of the s-PAT-supported catalyst, we further explored the reusability of the s-PAT supported AuNS catalyst.

FIGS. 9(a)-9(d) depicts UV-vis absorption spectra of the 4-NP reduction with different recycling times ranging from (a) the first time, (b) the fifth time, (c) the tenth time to (d) the fifteenth time, respectively. As shown in FIGS. 9(a)-(d) and FIG. 10(a), the fresh AuNS/pulp catalyst showed 98.3% conversion within 6 min and its apparent rate (k value) was 0.0106 s$^{-1}$. After four recycling times, the catalyst could still exhibit almost the same efficiency as the fresh one. The k value of the AuNS/pulp catalyst in the fifth cycle (0.0102 s$^{-1}$) remained almost the same as that in the fresh catalyst. The catalytic efficiencies at 7 min could still reach 96.3% and 91.6% in the tenth and fifteenth cycles, respectively. However, many other solid catalysts can be reused just for five or ten cycles and the catalytic efficiency usually decreases below 90% or 85%. Hence, the s-PAT supported AuNS/pulp catalyst exhibits excellent reusability, and have great potential for various industrial applications.

Figure 10A:
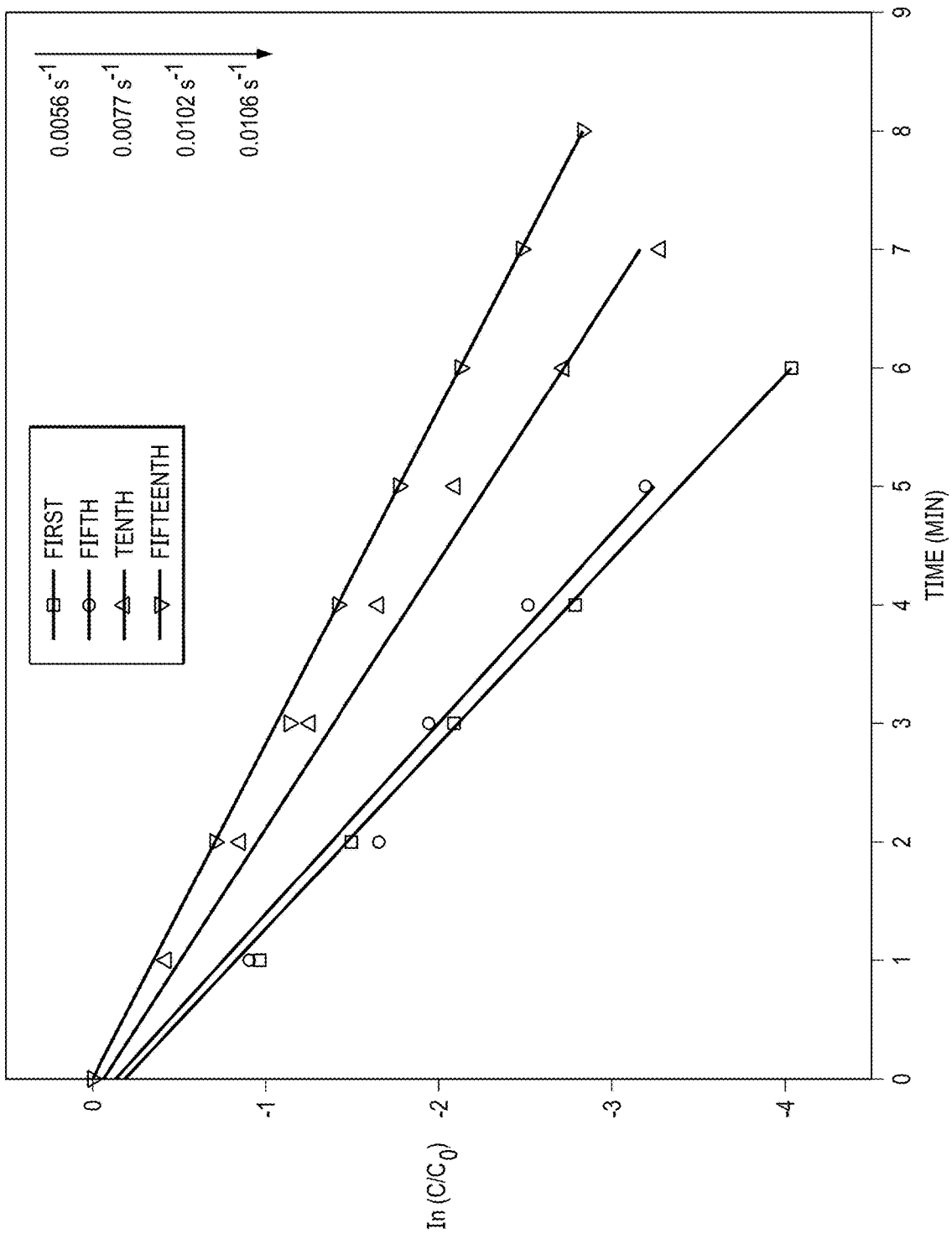
FIG. 10(a) depicts Ln(Ct/C0) vs. time plot with different recycling times over the AuNS/pulp catalyst.
Figure 10B:
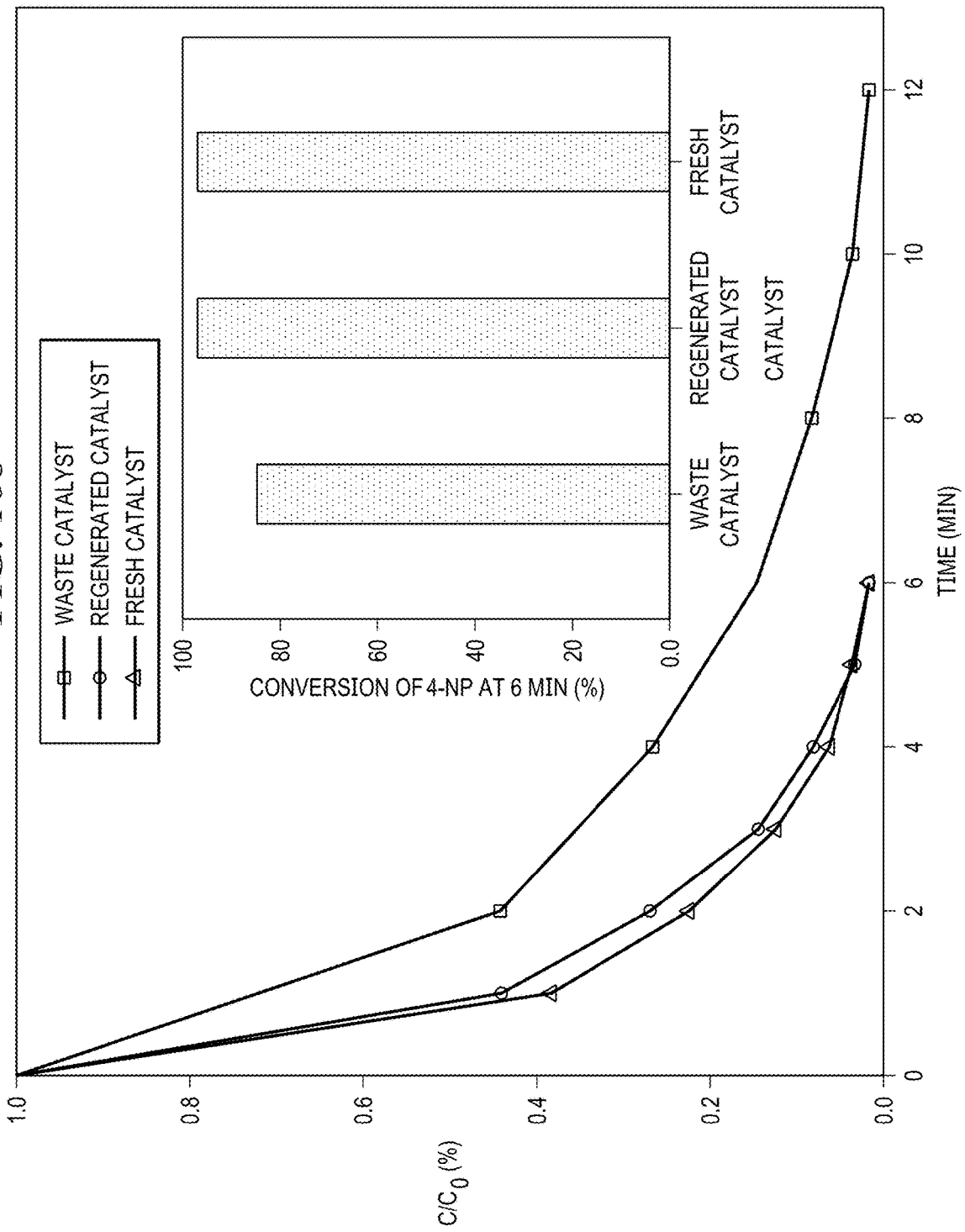
FIG. 10(b) depicts Ct/C0 vs. time plot of the fresh, waste, and regenerated catalysts.

Although the AuNS/pulp catalyst exhibited excellent reusability, we still observed that the catalytic efficiency decreased slightly with the increase of the recycling times. As shown in FIG. 10(a), the k values decreased from 0.0077 to 0.0056 s$^{-1}$ from the 10th to the 15th cycles. The decrease of the catalytic efficiency after many recycling times was possibly due to the dissolution of AuNS in water. Therefore, the catalyst would eventually become a waste catalyst if the catalytic efficiency could not satisfy the requirement. In this work, it was defined as a waste catalyst when the fresh catalyst was reused for 16 times. Therefore, along with the recycling times, we also investigated the regeneration feasibility of a waste catalyst. For the regeneration of a waste catalyst, 45 mg waste catalyst and 4 mg HAuCl4.3H2O (4.4 wt. % AuNPs) were added into 3 mL water to obtain the pulp solution under vigorous stirring. Then a NaBH4 solution (3 mg NaBH4 in 3 mL water) was quickly added to the pulp suspension to completely reduce Au3+ with vigorous stirring for 1 h. At last, the as-prepared black suspended paper fibers were centrifuged and washed three times with water to obtain the purple pulp. After the purple pulp was dried at 60° C. for 6 h, the waste AuNS/pulp catalyst was regenerated.

Figure 11A:
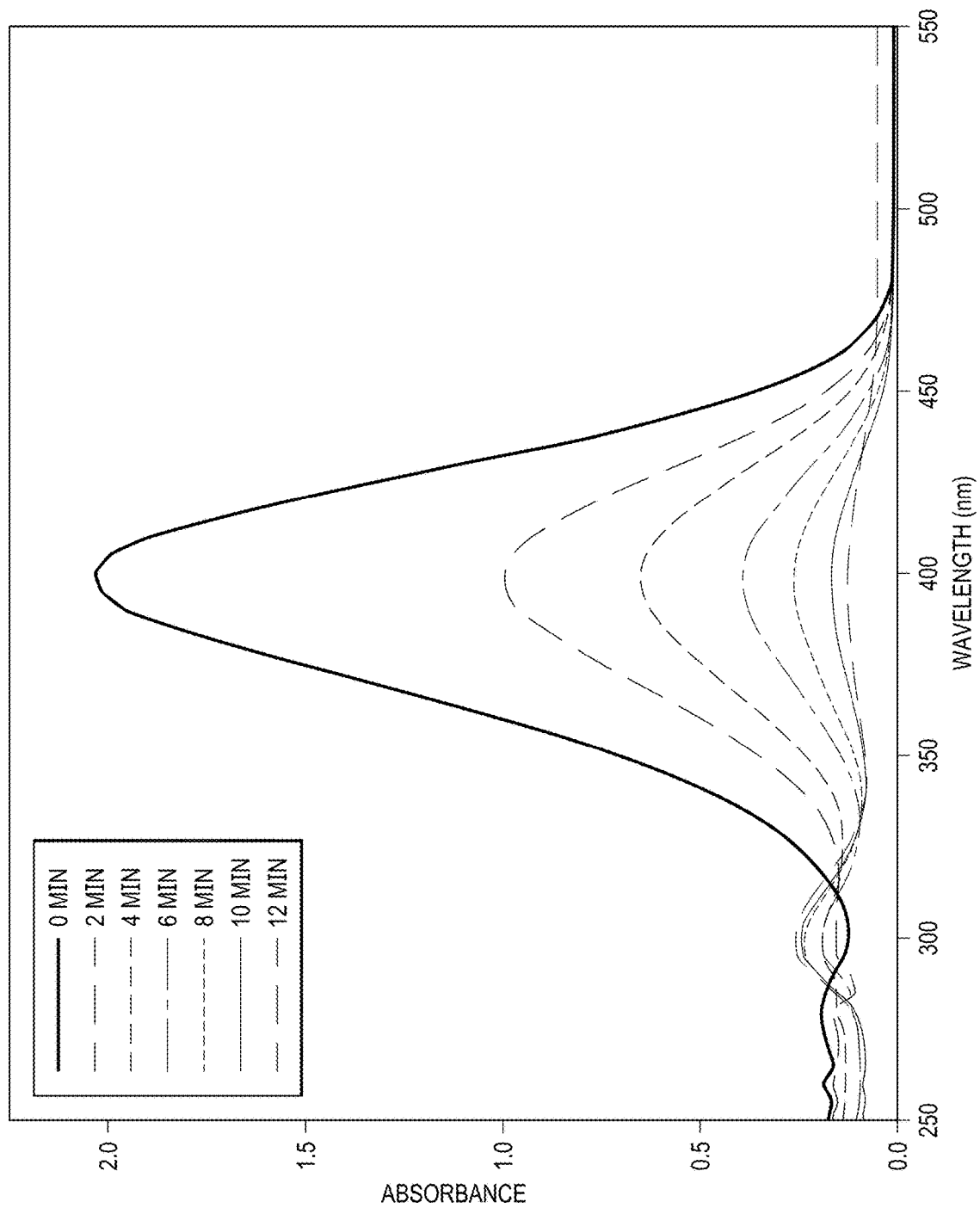
FIG. 11(a) depicts UV-vis absorption spectra of the 4-NP reduction by the sixteenth recycling time catalyst.
Figure 11B:
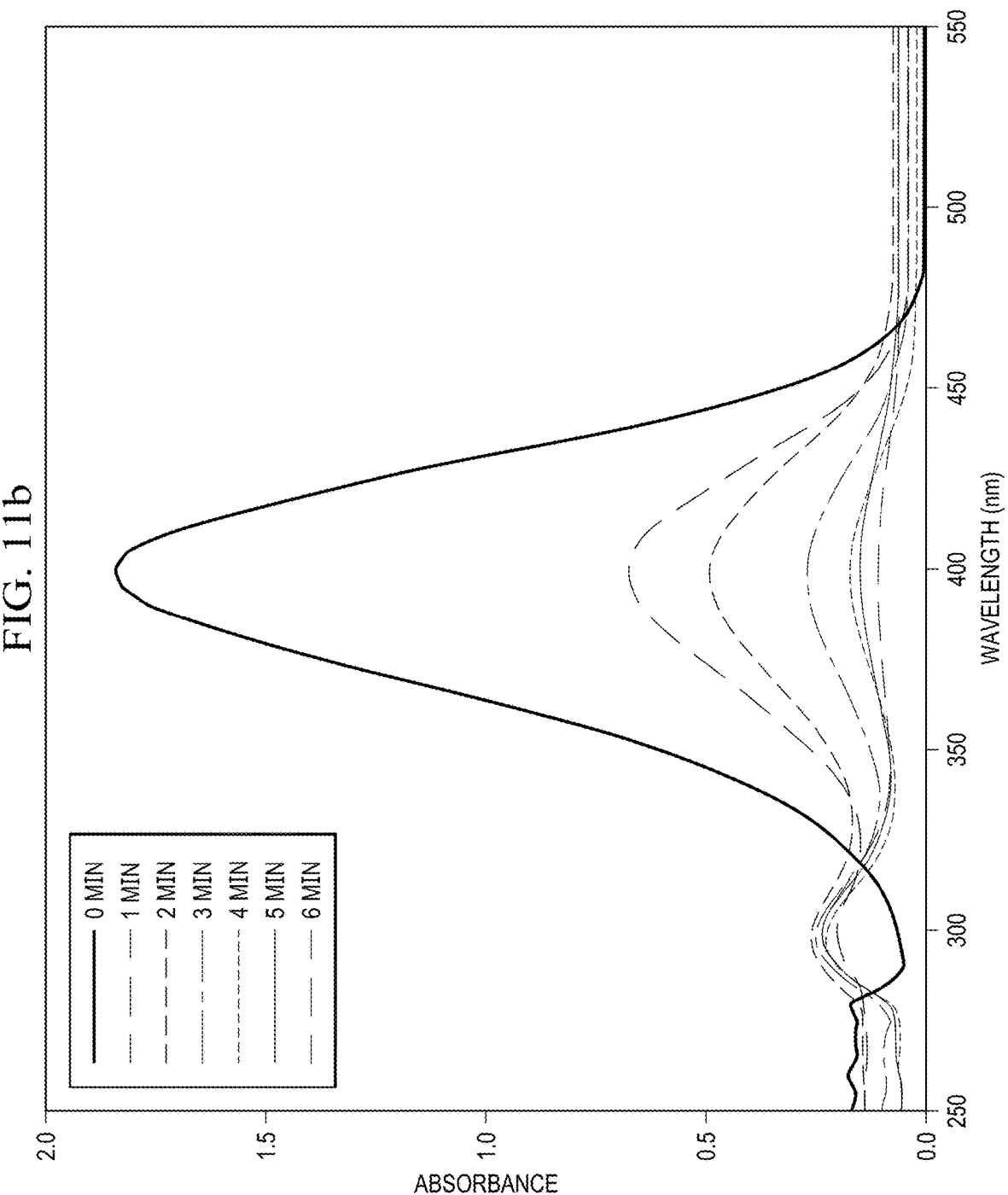
FIG. 11(b) depicts UV-vis absorption spectra of the 4-NP reduction by the regenerated catalyst.
Figure 11C:
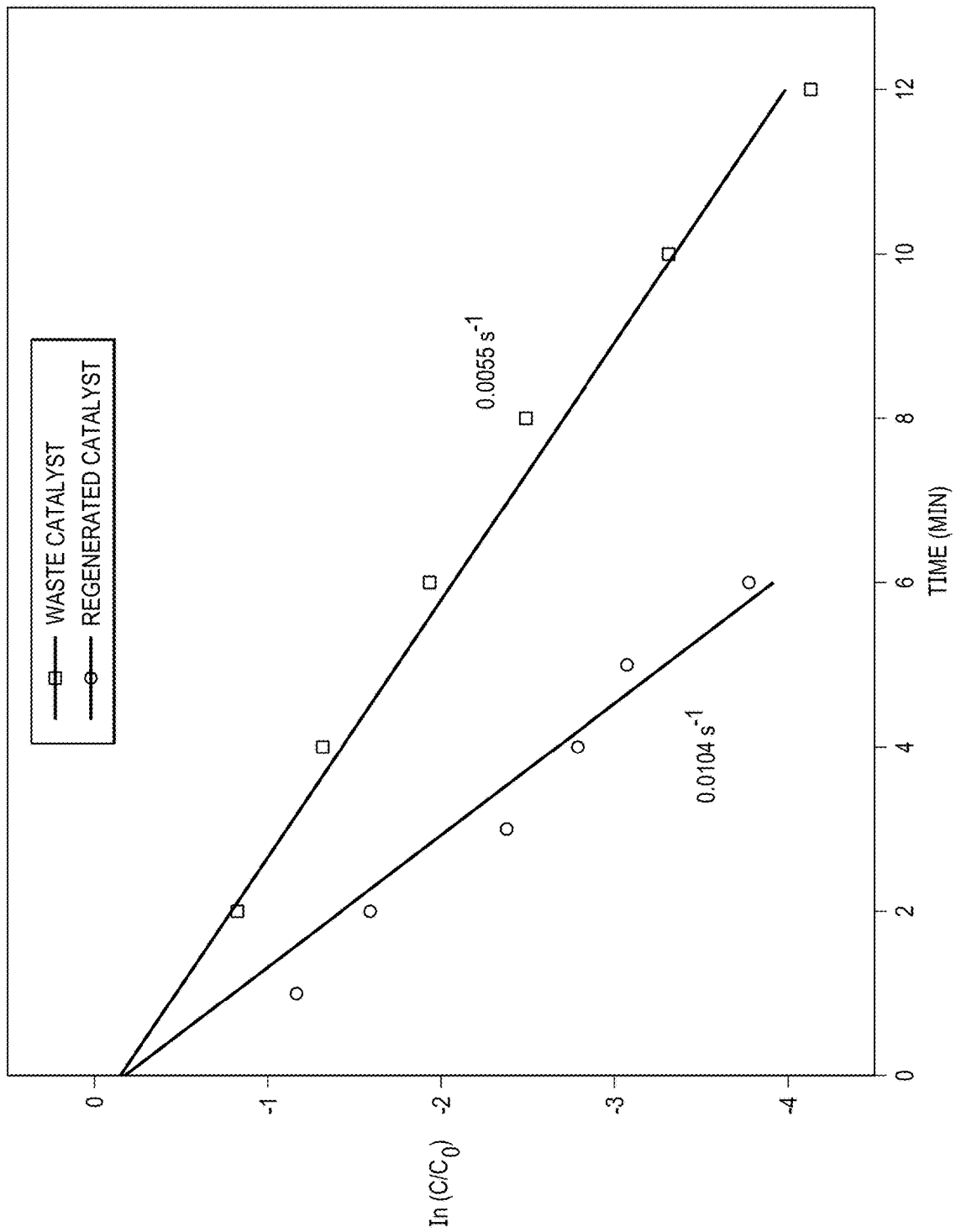
FIG. 11(c) depicts ln(Ct/C0) vs. time plot representing first order kinetics of the 4-NP reduction of the waste catalyst and regenerative catalyst.

FIG. 10(b) and FIGS. 11(a)-11(c) show the catalytic comparison in the 4-NP reduction by refresh, 16th recycled, and regenerated AuNS/pulp catalysts. FIGS. 11(a) and 11(b) depict UV-vis absorption spectra of the 4-NP reduction (a) the sixteenth recycling time and (b) regenerated catalyst, respectively. FIG. 11(c) depicts ln(Ct/C0) vs. time plot representing first order kinetics of the 4-NP reduction of the waste catalyst and regenerative catalyst.

The waste catalyst (i.e. 16 cycles times) finished the catalytic reaction within 12 min and the 4-NP conversion reached 85.3% at 6 min. Its apparent rate (k value) was only 0.0055 s$^{-1}$. However, the regenerated catalyst reached 98.4% within 6 min, and its k value was recovered to 0.0104 s$^{-1}$. The result from the regenerated AuNS/pulp catalyst was comparable with the fresh catalyst. Thus, high catalytic efficiency can be recovered by loading a small quantity (4.4 wt. %) of AuNS to a waste catalyst. In other words, the outstanding regeneration capacity of the AuNS/pulp catalyst further enhances its reusability. In summary, the s-PAT-supported AuNS/pulp catalyst exhibits not only high catalytic efficiency, but also outstanding reusability and regeneration capacity.

Figure 12A:
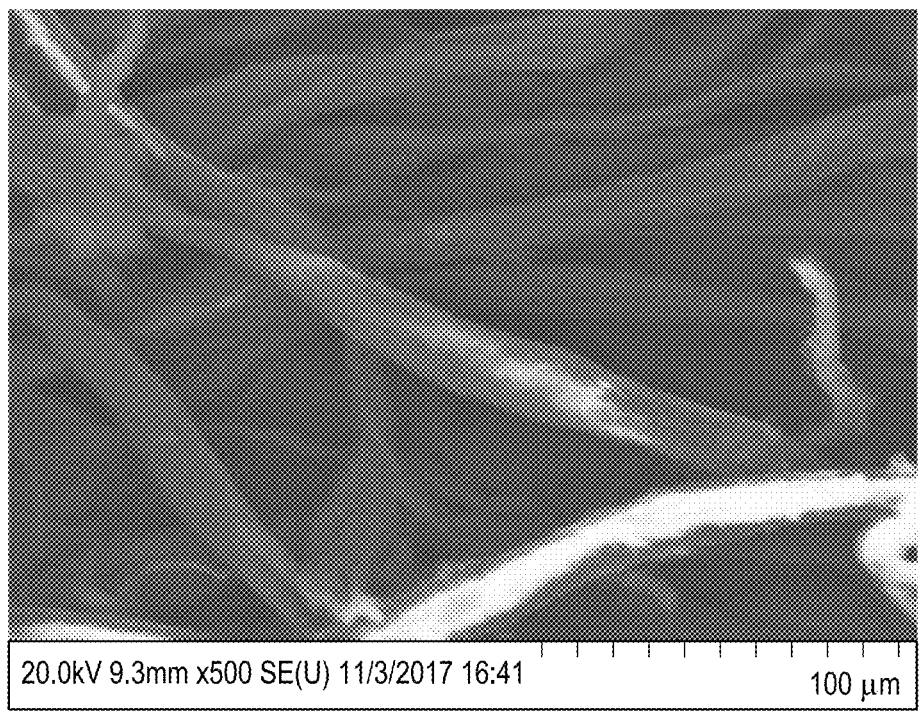
FIG. 12(a) depicts a SEM micrograph of chromatography paper.
Figure 12B:
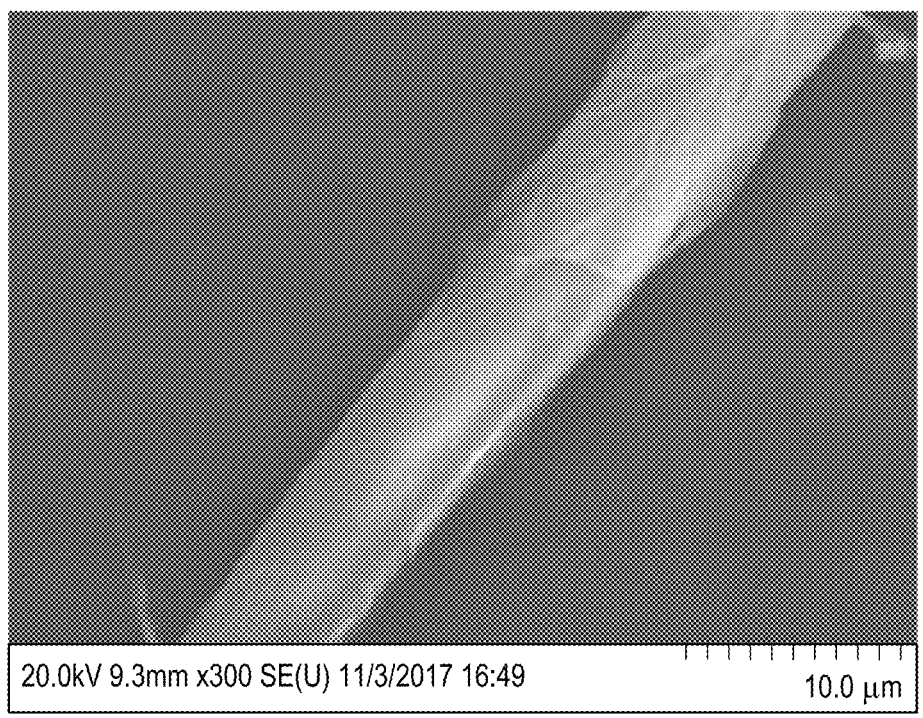
FIG. 12(b) depicts higher-magnification SEM micrograph of chromatography paper.
Figure 12C:
FIG. 12(c) depict a SEM micrograph of fresh AuNS/pulp.
Figure 12D:
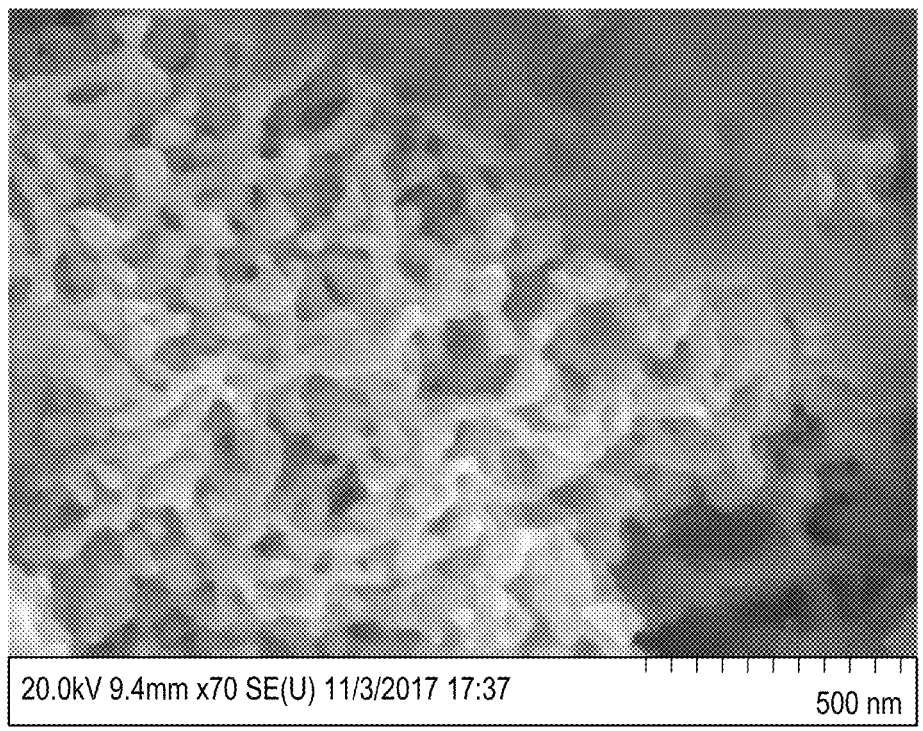
FIG. 12(d) depicts a higher-magnification SEM micrograph of fresh AuNS/pulp.

We also performed SEM, XRD, TGA, FT-IR and XPS to characterize the composition, structure, and morphology of the s-PAT supported AuNS/pulp catalyst. FIGS. 12(a)-12(d) show SEM micrographs of the chromatography paper and the fresh AuNS/pulp catalyst. As shown in FIG. 12(a) and FIG. 12(b), the chromatography paper consisted of many long fibers with smooth surface. From the measurement, the diameter of the fiber was found to be about 10-20 μm. As shown in FIG. 12(c) and FIG. 12(d), the Au nanosponge had a porous structure, which was like a sponge and the size of AuNS was about 50-100 nm. AuNS nanostructures clumped together and were entwined around long paper fibers. In comparison between FIG. 12(a) and FIG. 12(c), it can be observed that the fiber surface of AuNS/pulp is not as smooth as that of chromatography paper, but the major microstructure looks similar between pulp and paper fibers. In addition, some white spots emerged from the chromatography paper but did not appear on the AuNS/pulp surface. The main reason was the conductivity of the chromatography paper increased after the growth of AuNS on it. In addition, SEM was employed for element mapping on the chromatography paper and the AuNS/pulp.

Figure 13A:
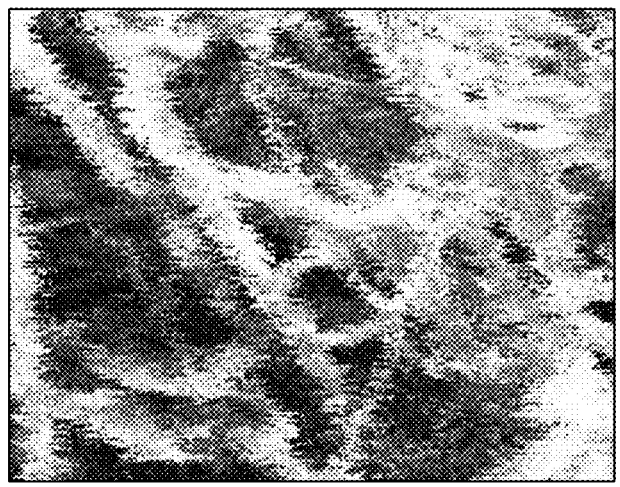
FIG. 13(a) depicts a SEM photograph of chromatography paper.
Figure 13B:
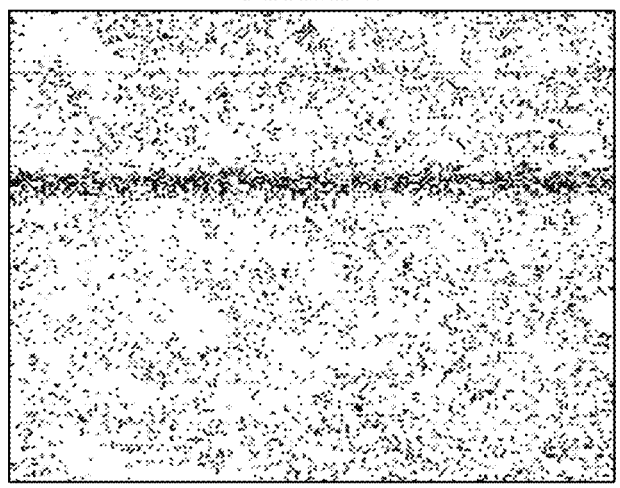
FIG. 13(b) depicts the element mapping of C on the chromatography paper.
Figure 13C:
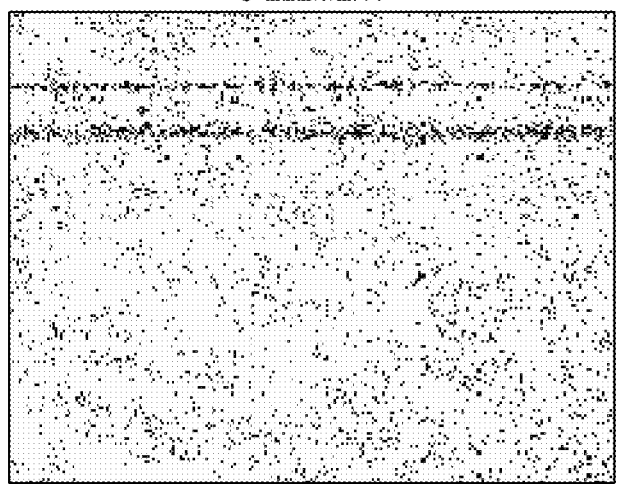
FIG. 13(c) depicts the element mapping of O on the chromatography paper.
Figure 14B:
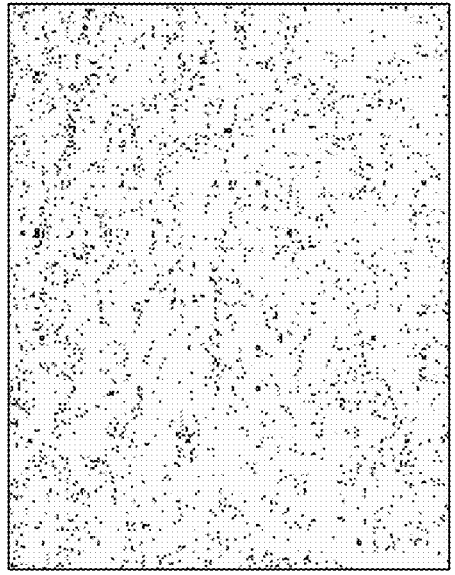
FIG. 14(b) depicts the element mapping of C on AuNS/pulp.
Figure 14D:
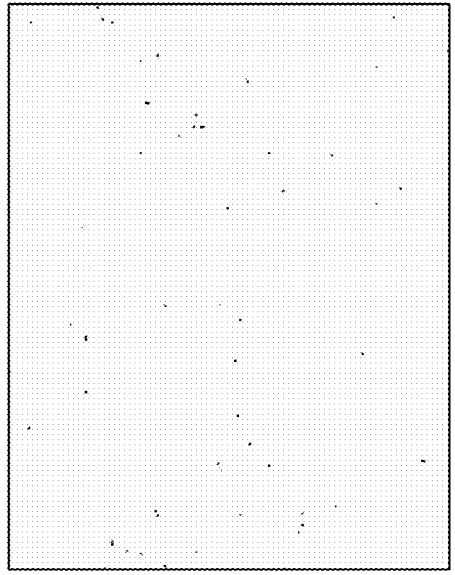
FIG. 14(d) depicts the element mapping of Au on AuNS/pulp.
Figure 14A:
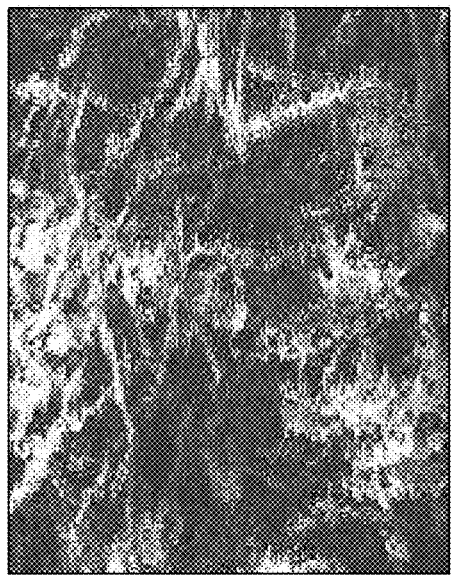
FIG. 14(a) depicts a SEM photograph of AuNS/pulp.
Figure 14C:
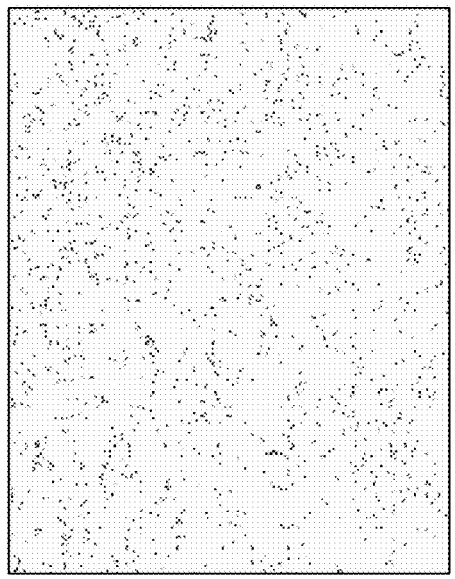
FIG. 14(c) depicts the element mapping of O on AuNS/pulp.

FIGS. 13(a)-13(c) depict an SEM photograph and elemental mapping of C and O on chromatography paper. FIGS. 14(a)-14(d) depict an SEM photograph and elemental mapping of C, O, and Au on AuNS/pulp. It can be observed that the C and O elements were well distributed on the chromatography paper surface. After the AuNS preparation on paper, Au was distributed on the AuNS/pulp surface, confirming the existence and the distribution of AuNS on the pulp.

Figure 15A:
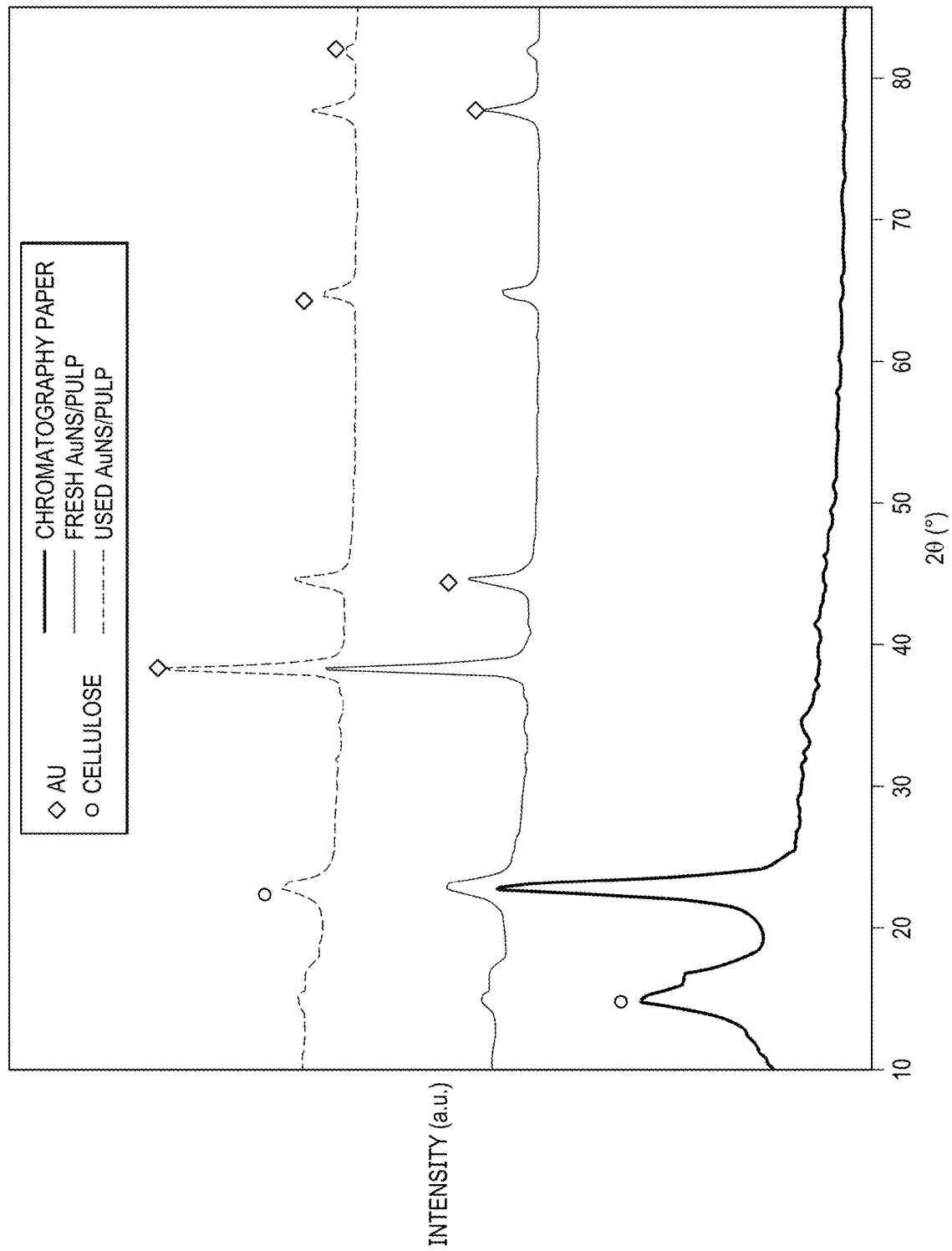
FIG. 15(a) depicts X-ray diffraction patterns of the chromatography paper and AuNS/pulp catalysts.

The XRD patterns of the chromatography paper, the fresh AuNS/pulp catalyst, and the used AuNS/pulp catalyst (reused for 10 times) were analyzed and the results were shown in FIG. 15(a). The crystallinity and crystallite size were calculated by the Debye-Scherrer equation (MDI Jade 5.0 software). All the reflections of the samples provided the diffraction patterns for cellulose (PDF-ICDD 50-2241) and Au (PDF-ICDD 04-0784). As shown in FIG. 15(a), the three strong peaks at 2θ=14.99°, 16.49°, 22.78° were attributed to cellulose (−110), (110) and (200) diffractions, respectively. The peaks at 38.18°, 44.39°, 64.58°, 77.54° corresponded to the gold (111), (200), (220) and (311) diffractions. It, therefore, suggested that the chromatography paper consisted of the crystalline cellulose. The crystallinity and crystallite size of cellulose crystals were 88% and 7 nm, respectively. In addition, the crystallinity and crystallite size of cellulose crystals exhibited no significant change when AuNS was prepared on the chromatography paper. In other words, the structure of the chromatography paper did not change after the AuNS preparation on it. Moreover, for the used AuNS/pulp catalyst, the intensity of cellulose decreased slightly compared with that of the fresh AuNS/pulp catalyst. It suggested that there was a small amount of cellulose loss after use. At last, the obvious Bragg reflections of Au were observed on the fresh AuNS/pulp surface and the crystallinity and the crystallite size of Au were 95% and 18 nm, respectively. The crystallinity and crystallite size of AuNS also had no obvious change after use, suggesting high reusability of the AuNS/pulp catalyst.

Figure 15B:
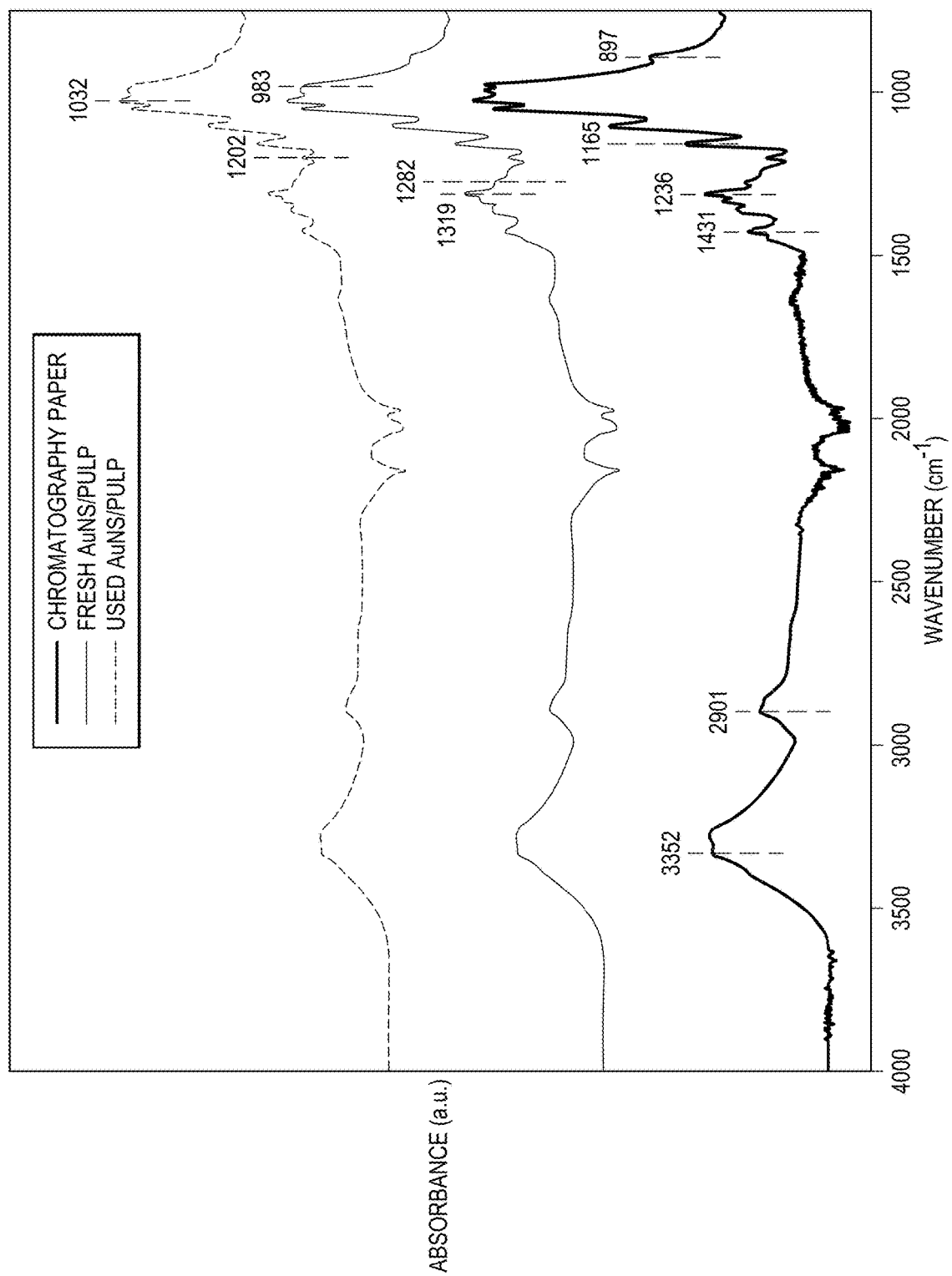
FIG. 15(b) depicts FT-IR spectra of the chromatography paper and AuNS/pulp catalysts.

FIG. 15(b) shows the FT-IR spectra of the chromatography paper, the fresh AuNS/pulp, and the used AuNS/pulp catalyst (750-4000 cm$^{-1}$). It can be seen that both FT-IR spectra from the chromatography paper, the fresh and used catalysts were similar to each other and all the peaks were attributed to cellulose I. From literature, the 3352 cm$^{-1}$ and 2901 cm$^{-1}$ peaks were attributed to O—H and C—H stretching vibrations, respectively. The bands at 1431 cm$^{-1}$, 1319 cm$^{-1}$, and 1282 cm$^{-1}$ were assigned as symmetric CH2 bending, CH2 wagging, and C—H bending. Both bands at 1236 cm$^{-1}$ and 1202 cm$^{-1}$ were assigned as C—O—H bending in plane at C-6. Both the bands at 1165 cm$^{-1}$ and 897 cm$^{-1}$ were assigned as C—O—C stretching at β-glucosidic linkage. Both bands at 1032 cm$^{-1}$ and 983 cm$^{-1}$ were assigned as C—O stretching vibrations at C-6. We can also find from FIG. 15(b) that the peak intensity decreased slightly with the addition of AuNS or after use. It was mainly due to the decrease of the relative amount of cellulose, which was consistent with XRD results. However, there was no peak shift observed, suggesting that the AuNS preparation process did not alter the original interactions among cellulose chains. In other words, the porous microstructure of the chromatography paper had no change after the AuNS preparation process, which was favorable to maintain high catalytic efficiency after many recycling times (see FIG. 10(a)), as discussed above.

Figure 16:
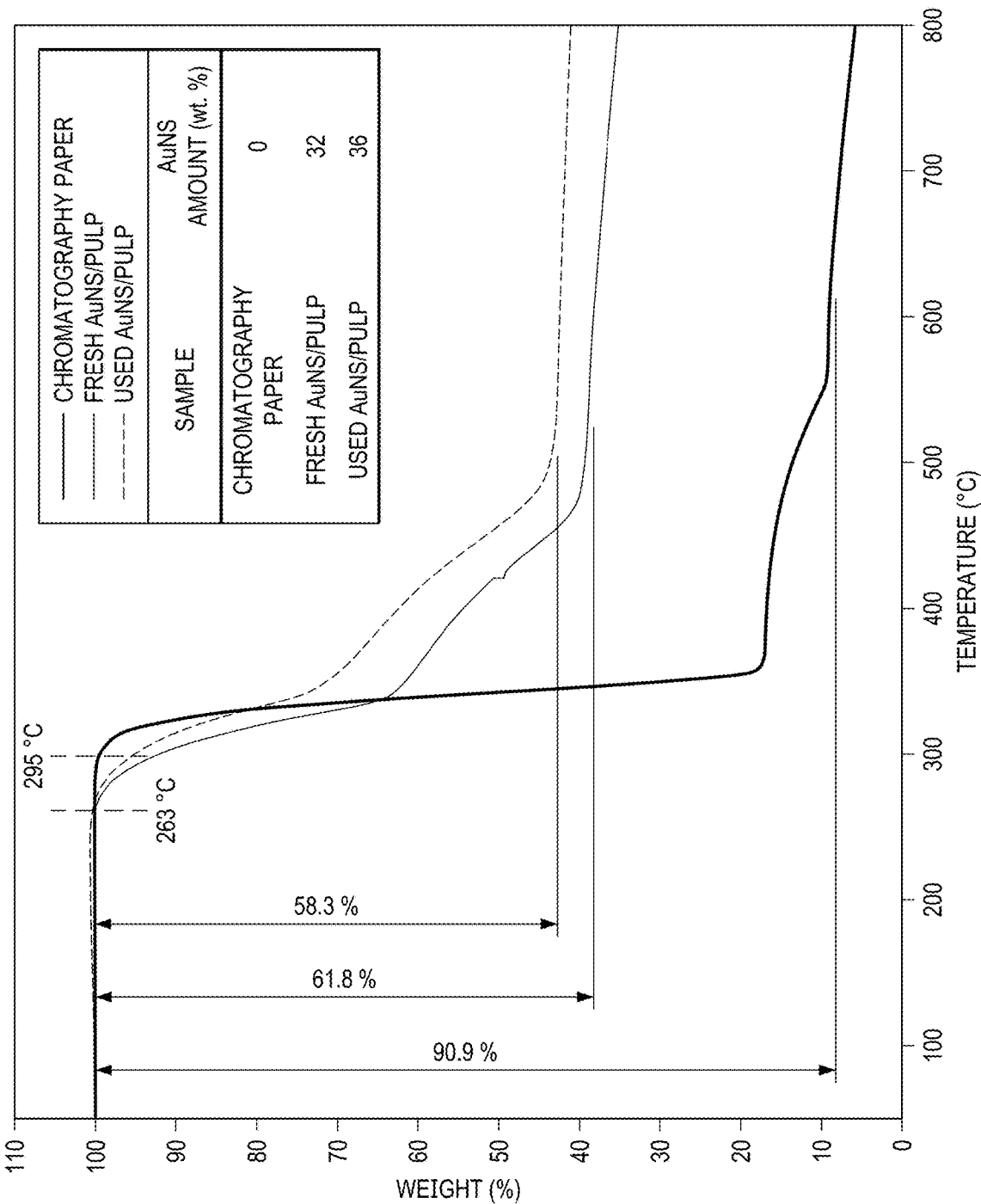
FIG. 16 depicts TGA thermograms of the chromatography paper and the AuNS/pulp catalyst.

FIG. 16 displays the TGA thermograms of the chromatography paper, the fresh AuNS/pulp, and the used AuNS/pulp catalyst. There was no weight loss until the temperature increased to 250° C. It was due to that the sample had been dried before each measurement so that moisture was eliminated. Then all the samples exhibited an obvious weight loss in the temperature range from 250 to 600° C. It was attributed to the decomposition, oxidation, and evolution of gases in the main organic components (cellulose). In addition, the degradation temperature of AuNS/pulp catalysts decreased to 263° C. while that of chromatography paper was 295° C. The shift of the degradation temperature may be due to the reason that AuNS acted as the catalyst which decreased the activation energy during the thermal event. In addition, the weight loss of the chromatography paper increased to 90.9% while that of the fresh AuNS/pulp and used AuNS/pulp catalysts increased to 61.8% and 58.3%, respectively. The difference was because of the existence of AuNS in the fresh AuNS/pulp and used AuNS/pulp catalysts. Therefore, the amount of AuNS in the AuNS/pulp catalyst could be deduced through the difference of the weight loss. It was noted that the fresh AuNS/pulp and the used AuNS/pulp contained 32 wt. % and 36 wt. % AuNS, respectively. This is because there was a small amount of cellulose loss, leading to the increase of the relative amount of AuNS after many times of reuse.

The surface composition and oxidation states of catalysts play an important role in the catalytic reduction reaction, so XPS was applied to investigate the surface properties of the s-PAT-supported AuNS/pulp catalysts. XPS analysis also further verified the formation of the AuNS/pulp catalyst and the efficient removal of oxygenated functional groups of the catalysts.

Figure 17A:
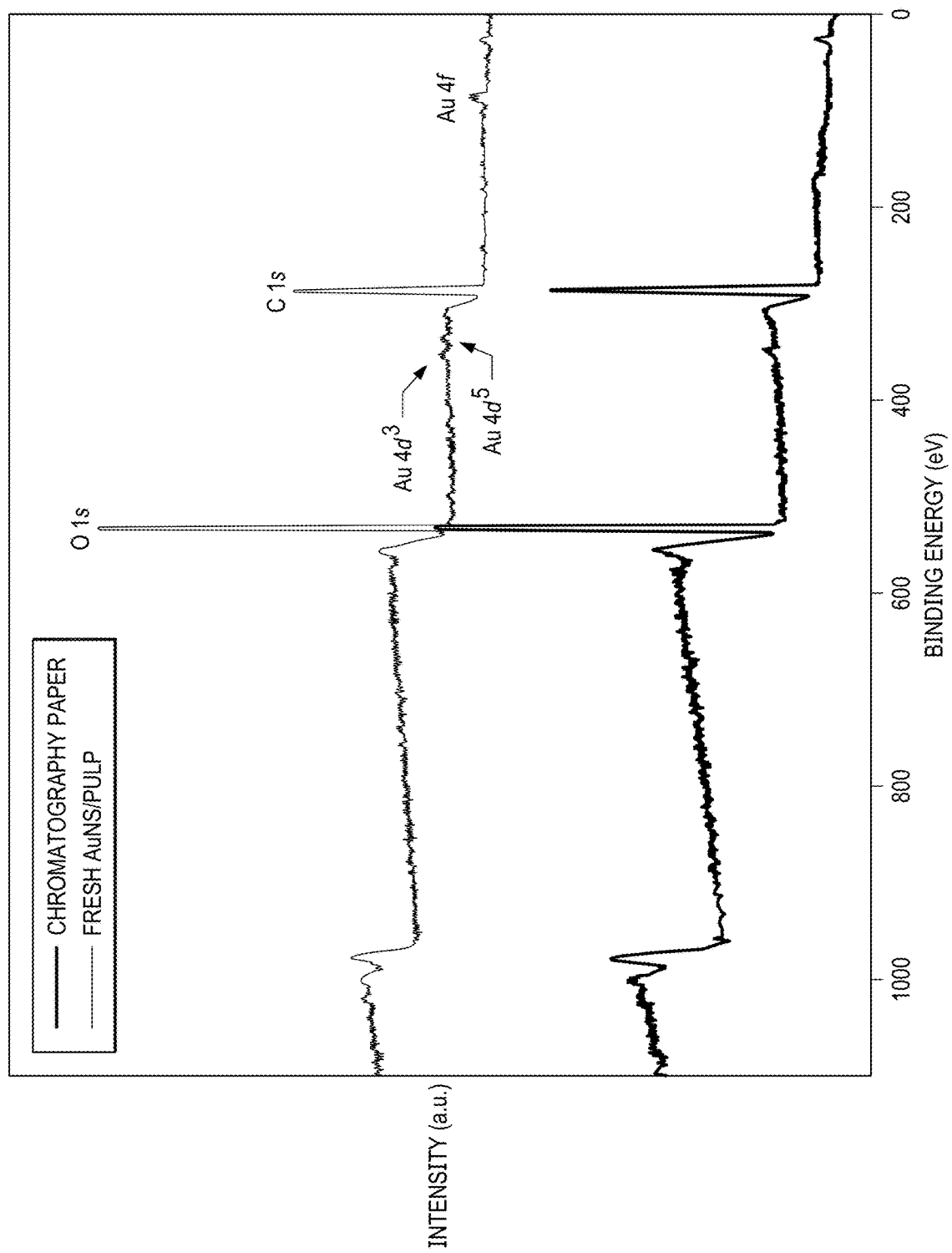
FIG. 17(a) depicts Survey XPS high-resolution scan spectra of the chromatography paper and the AuNS/pulp catalysts.

FIGS. 17(a)-17(d) depict (a) Survey, (b) O 1s, (c) C 1s, and (d) Au 4f XPS high-resolution scan spectra, respectively, of the chromatography paper and the AuNS/pulp catalysts. As shown in FIG. 17(b), the O 1s peaks can be fitted into three peaks and two of which corresponded to the cellulose: the one centered at about 533.1 eV was the oxygen in ether groups (hereafter denoted as Oc) and the other one centered at about 532.8 eV was the oxygen atoms in alcohol groups (hereafter denoted as on). Furthermore, a relatively well-developed peak located between 530.4 eV and 532.8 eV could be attributed to the presence of either loosely bound oxygen or hydroxide (OH—, hereafter denoted as Oα). The intensities of O 1s peaks decreased because the relative content of oxygen reduced after the AuNS preparation process. In addition, the O 1s peaks of AuNS/pulp showed a shift toward higher binding energy after the AuNS preparation process, indicating that there was strong interaction between Au and O atoms. The strong interaction also guaranteed that the AuNS catalyst would not be washed away from the chromatography paper after use.

Figure 17C:
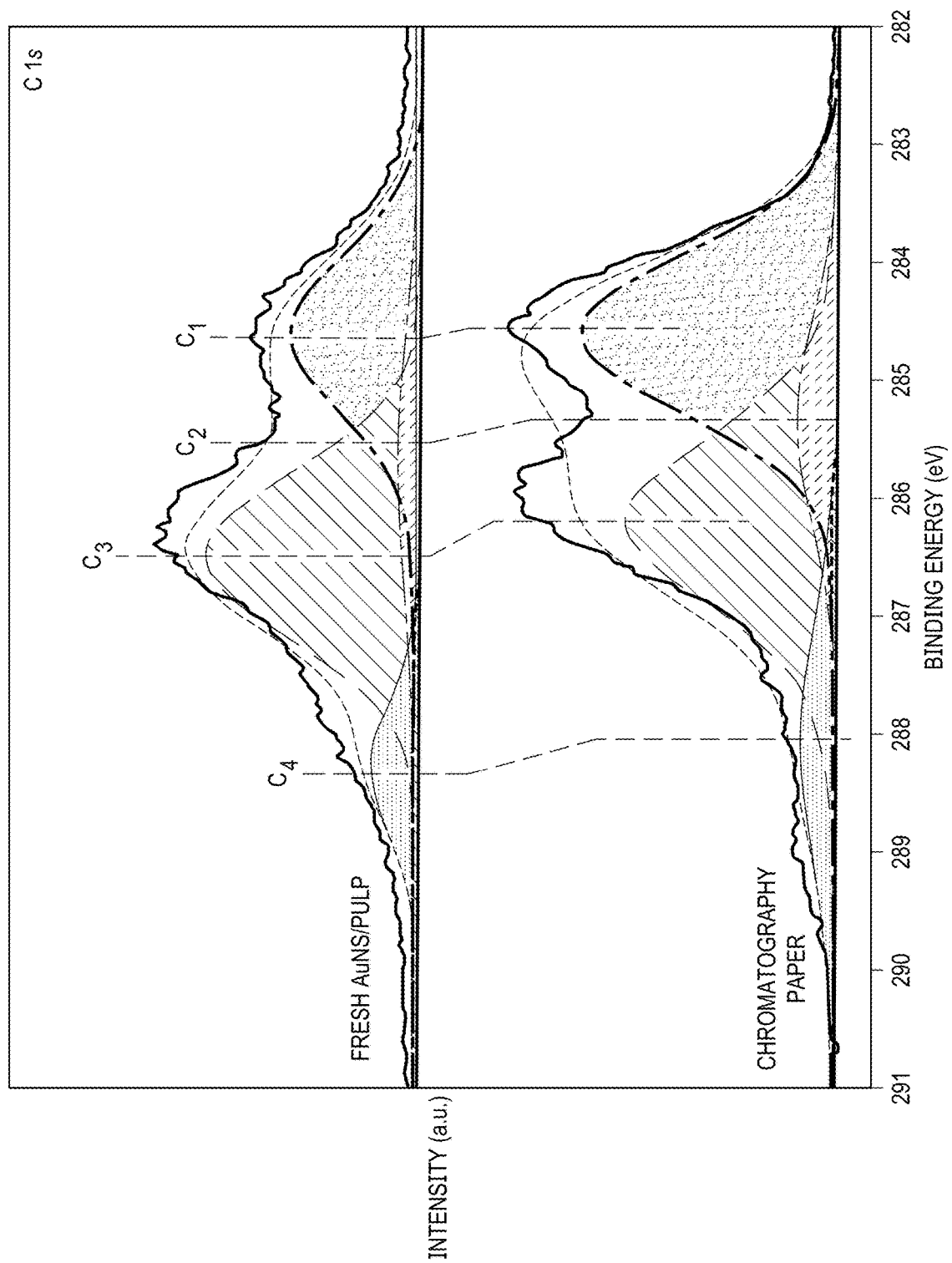
FIG. 17(c) depicts C 1s XPS high-resolution scan spectra of the chromatography paper and the AuNS/pulp catalysts.

As shown in FIG. 17(c), the C 1s can be divided into four peaks: (1) the peak located at 284.7 eV was the carbon bond to carbon (C—C, hereafter denoted as C1); (2) the peak located at 285.3 eV was the spa carbon bond to hydrogen atoms (C—O, hereafter denoted as C2); (3) the peak located at 286.2 eV was the cellulose carbon bond to a single oxygen (C=O, hereafter denoted as C3); (4) the peak located at 288.0 eV was the cellulose carbons bond to two oxygen atoms (O—C=O, hereafter denoted as C4). Corresponding to the analogous law, the AuNS preparation on paper caused the decrease of the intensity of C 1s peaks and the shift toward the higher binding energy. In other words, there was strong interaction among Au, C and O atoms.

Figure 17D:
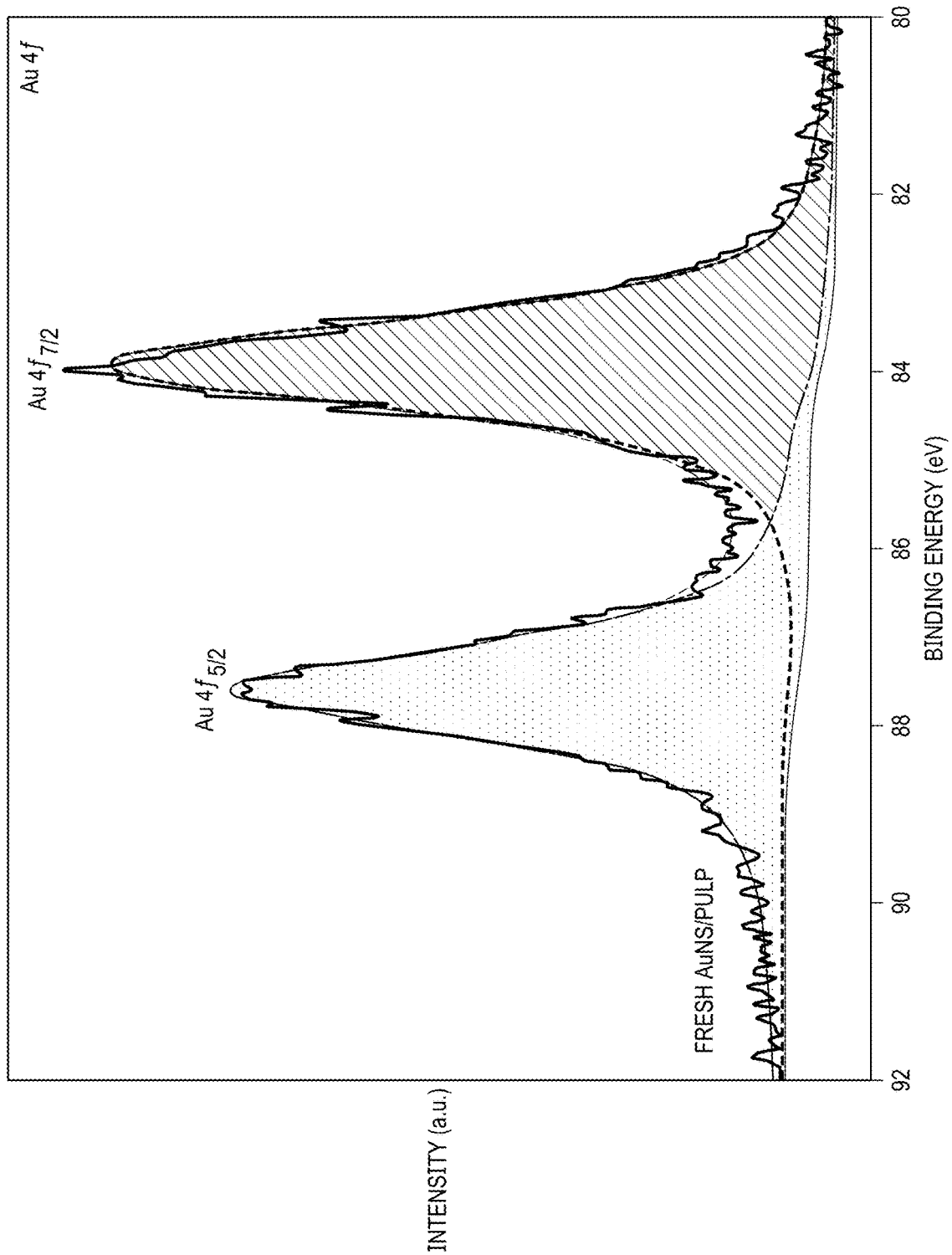
FIG. 17(d) depicts Au 4f XPS high-resolution scan spectra of the chromatography paper and the AuNS/pulp catalysts.

FIG. 17(d) shows the Au 4f XPS spectra of the AuNS/pulp catalyst. The strong doublet peaks of Au 4f emerging at 87.6 eV and 83.9 eV were attributed to Au$^0$ 4/5/2 and Au$^0$4f7/2, respectively. There was also no other peak ascribed to Au$^{3+}$, illustrating that the reduction of Au$^{3+}$ to Au0 was complete after the AuNS preparation process. These observations revealed that Au0 was the predominant species in the AuNS/pulp catalyst.

Table 4 lists the atomic ratios on the surface of the chromatography paper and the fresh AuNS/pulp catalyst.

TABLE 4

Atomic ratios on the surface of the chromatography paper and AuNS/pulp catalyst.

| Sample | $O_\alpha/(O^*)$ | $O_\beta/(O^*)$ | $O_c/(O^*)$ | $C_1/(C^*)$ | $C_2/(C^*)$ | $C_3/(C^*)$ | $C_4/(C^*)$ |
|---|---|---|---|---|---|---|---|
| chromatography paper | 0.57 | 0.37 | 0.06 | 0.42 | 0.09 | 0.40 | 0.09 |
| AuNS/pulp | 0.53 | 0.41 | 0.06 | 0.32 | 0.07 | 0.53 | 0.08 |

$O^* = O_\alpha + O_\beta + O_c$; $C^* = C_1 + C_2 + C_3 + C_4$

For the O element, the noticeable change was the decrease of hydroxide (Oα). Both the relative content of Oβ and Oc increased slightly but the increase of Oc was not so obvious. That is, the AuNS preparation process resulted in the decrease of hydroxide on the chromatography paper surface. For the C element, the relative content of C3 increased obviously and that of C1 reduced after the AuNS preparation process. We speculate that the atomic ratio changes were due to the reaction between the C—C bond and hydroxide adsorbed on the chromatography paper surface during the AuNS preparation process. Therefore, the cleavage of the C—C bond and the formation of the C=O bond occurred during the AuNS preparation stage. However, according to the other data, the overall structure of the chromatography paper maintained during the AuNS preparation process.

In this work, a facile one-step approach to synthesize the smart paper transformer s-PAT-supported AuNS/pulp was developed. After systematic studies of the composition, structure, and morphology of the AuNS/pulp catalyst by different characterization techniques such as XRD, TGA, SEM, FT-IR, and XPS, the s-PAT supported AuNS/pulp was successfully applied for efficient catalytic reduction of 4-NP with high reusability. The porous microstructures of AuNS and paper and the uniform distribution of AuNS catalysts in solutions by the s-PAT liquid phase all contributed high catalytic efficiency of the AuNS/pulp catalyst, while the transformation to the solid phase of s-PAT enabled glorious reusability and regeneration capacity.

More importantly, this is the first time to develop and apply the smart paper transformer to nanocatalysis. The smart transformation between the liquid phase of pulp and the solid phase paper from the s-PAT-supported noble metal nanocatalysts ensures not only high catalytic efficiency, but also excellent reusability. s-PAT can maintain high catalytic efficiencies even after many times of reuse. For instance, the conversion rate of 4-NP reached nearly 100% within 6 min under optimal conditions. The comparison between the AuNS/pulp with AuNS/paper catalysts clearly indicated superior catalytic efficiency of the s-PAT supported AuNS/pulp to AuNS/paper. Furthermore, the AuNS/pulp catalyst still exhibited the high catalytic efficiency of 91.6% within 7 min in the fifteenth cycles of reuse for the 4-NP reduction. As well known, liquid phase catalysts can exhibit high catalytic efficiency but not good reusability. On the contrary, solid phase catalysts can easily achieve high reusability but not high catalytic efficiency. Therefore, this innovative phase transformation solves a vital problem in the current field of catalysis by fusing high efficiency and outstanding reusability onto same nanocatalysts, and shed light on efficient and cost-effective catalysis in many fields ranging from environmental salvage and organic synthesis to biomass conversion and large-scale industrial applications.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

It should be understood that embodiments discussed herein are not limited to the particular features and processing steps shown. The descriptions provided herein are not intended to encompass all of the steps that may be used. Certain steps that are commonly used are purposefully not described herein for economy of description.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of catalytic reduction on a paper transformer, the method comprising:
    stirring a gold nanosponge (AuNS) catalyst in a solid paper phase into water to form an AuNS catalyst pulp;
    adding an aqueous solution of a nitroaromatic compound and $NaBH_4$ to the AuNS catalyst pulp and stirring, thereby reducing the nitroaromatic compound; and
    regenerating used AuNS catalyst.

2. The method of claim 1, further comprising:
    washing and centrifuging the AuNS catalyst pulp with water a number of times after the the catalytic reduction of the nitroaromatic compound; and
    drying the AuNS catalyst pulp to transform the AuNS catalyst back to a solid paper phase to recover the AuNS catalyst.

3. The method of claim 2, wherein the AuNS catalyst pulp maintains a catalytic efficiency of over 90% for up to 15 use cycles.

4. The method of claim 1, wherein a molar ratio of the $NaBH_4$ to the nitroaromatic compound is 100 or less.

5. The method of claim 1, wherein the nitroaromatic compound is p-nitrophenol.

6. The method of claim 1, wherein the nitroaromatic compound is o-nitroaniline.

7. The method of claim 1, wherein the regenerating of the used AuNS catalyst comprises:
    combining waste catalyst with $HAuCl_4$ and stirring together in an aqueous solution to form a pulp;
    adding $NaBH_4$ to the pulp and stirring to reduce $Au^{3+}$;
    centrifuging and washing the pulp; and
    drying the pulp.

8. The method of claim 7, wherein the $NaBH_4$ and the pulp are stirred for one hour.

9. The method of claim 7, wherein the pulp is centrifuged and washed three times.

10. The method of claim 7, wherein the pulp is dried at 60° C. for six hours.

11. The method of claim 1, wherein the AuNS catalyst pulp has a k value of $0.0106s^{-1}$.

12. The method of claim 1, wherein transformation of the solid paper phase to the pulp phase enables uniform distribution of the AuNS catalyst in a solution.

13. The method of claim 1, wherein the regenerating of the used AuNS catalyst comprises:
    combining used AuNS catalyst pulp with $HAuCl_4.3H_2O$ and stirring together in an aqueous solution to form a pulp;
    treating the pulp with $NaBH_4$ aqueous solution;
    washing and centrifuging the treated pulp with water a number of times; and
    drying the treated pulp.

14. The method of claim 1, wherein the used AuNS catalyst are regenerated after 16 use cycles.

\* \* \* \* \*